United States Patent
Campbell et al.

(10) Patent No.: US 6,408,009 B1
(45) Date of Patent: *Jun. 18, 2002

(54) METHOD AND APPARATUS FOR DETECTING COLLISIONS ON AND CONTROLLING ACCESS TO A COMMUNICATIONS CHANNEL

(75) Inventors: Graham M. Campbell, Batavia; Chien-Ting Wu, Chicago, both of IL (US)

(73) Assignee: Illinois Institute of Technology, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/975,221

(22) Filed: Nov. 20, 1997

Related U.S. Application Data

(60) Continuation of application No. 08/476,426, filed on Jun. 7, 1995, now abandoned, which is a continuation-in-part of application No. 08/346,156, filed on Nov. 29, 1994, now abandoned, which is a division of application No. 08/073,206, filed on Jun. 4, 1993, now Pat. No. 5,390,181.

(51) Int. Cl.⁷ .................................................. H04J 3/16
(52) U.S. Cl. ...................................................... 370/461
(58) Field of Search ................................. 370/461, 449, 370/447, 446, 445, 444, 443, 451, 455, 458, 462, 408, 347, 348, 349, 337, 321, 441, 442, 428, 411, 412, 403, 413–419, 465, 466, 474; 340/825.5, 825.51, 825.52, 825.08

(56) References Cited

U.S. PATENT DOCUMENTS

| | | | | |
|---|---|---|---|---|
| 5,150,358 A | * | 9/1992 | Punj et al. ..................... | 370/84 |
| 5,210,750 A | * | 5/1993 | Nassehi et al. ............ | 370/85.2 |
| 5,233,606 A | * | 8/1993 | Pashan et al. .............. | 370/85.6 |
| 5,295,140 A | * | 3/1994 | Crisler et al. .............. | 370/94.1 |
| 5,390,181 A | * | 2/1995 | Campbell et al. .......... | 370/85.2 |
| 5,392,285 A | * | 2/1995 | Kurts ........................ | 370/85.2 |

OTHER PUBLICATIONS

Xu, Wenxin; "Distributed Queueing Random Access Protocols for a Broadcast Channel"; thesis paper, Illinois Institute of Technology; Chicago, Il, Dec. 1990.*

* cited by examiner

Primary Examiner—Dang Ton
(74) Attorney, Agent, or Firm—Paul Petersen Kinne & Erickson

(57) ABSTRACT

A nodal apparatus for sending and receiving digital data in multiple data slots has a transmitter for transmitting a request for multiple data slots during a control minislot. A conflict resolution queue representative of nodal apparatus sending substantially simultaneous requests for transmission resulting in a collision in a minislot is maintained and stored in a memory. A transmission queue representative of nodal apparatus that have successfully transmitted in a minislot and can be queued for data slot transmission is stored in memory. The transmitter sends multiple data slots signals comprising multiple slots of digital data in response to the transmission queue. A receiver receives multiple data slots signals comprising digital data. A high priority transmission queue may also be stored in memory.

7 Claims, 30 Drawing Sheets

| CRI LENGTH | | | | | |
|---|---|---|---|---|---|
| MULTIPLICITY n | NUMBER OF MINISLOTS | | | | |
| | 2 | 3 | 4 | 8 | 16 |
| 0 | 1.000 | 1.000 | 1.000 | 1.000 | 1.000 |
| 1 | 1.000 | 1.000 | 1.000 | 1.000 | 1.000 |
| 2 | 2.000 | 1.500 | 1.333 | 1.142 | 1.066 |
| 3 | 3.333 | 2.250 | 1.866 | 1.396 | 1.192 |
| 4 | 4.761 | 3.115 | 2.514 | 1.736 | 1.369 |
| 5 | 6.209 | 4.026 | 3.222 | 2.139 | 1.591 |
| 6 | 7.656 | 4.951 | 3.958 | 2.590 | 1.853 |
| 7 | 9.100 | 5.874 | 4.703 | 3.074 | 2.149 |
| 8 | 10.542 | 6.792 | 5.447 | 3.582 | 2.475 |
| 9 | 11.984 | 7.704 | 6.185 | 4.104 | 2.826 |
| 10 | 13.426 | 8.612 | 6.915 | 4.635 | 3.198 |

FIG.5

| MAXIMUM INPUT RATE AND THE CORRESPONDING WINDOW SIZE AS A FUNCTION OF THE MINISLOT NUMBER ||||||
|---|---|---|---|---|---|
| m | MAX INPUT RATE | WINDOW SIZE | m | MAX INPUT RATE | WINDOW SIZE |
| 2 | 0.859 | 2.642 | 10 | 2.4891 | 2.520 |
| 3 | 1.2400 | 2.794 | 11 | 2.6063 | 2.483 |
| 4 | 1.5156 | 2.835 | 12 | 2.7171 | 2.442 |
| 5 | 1.7353 | 2.799 | 13 | 2.8226 | 2.425 |
| 6 | 1.9207 | 2.726 | 14 | 2.9234 | 2.409 |
| 7 | 2.0834 | 2.670 | 15 | 3.0201 | 2.376 |
| 8 | 2.2299 | 2.611 | 16 | 3.1133 | 2.363 |
| 9 | 2.3642 | 2.552 | | | |

FIG.6

| COMPARISONS OF THE AVERAGE DELAY AND DEVIATION BETWEEN DQRAP AND THE M/D/1 SYSTEM (THE NUMBER OF MINISLOTS = 3) | | | | |
|---|---|---|---|---|
| NOMINAL INPUT RATE | SIMULATED INPUT RATE | PROTOCOLS | | |
| | | M/D/1 ANALYZED | M/D/1 SIMULATED | DQRAP SIMULATED |
| | | AVG | AVG/STD | AVG/STD |
| 0.10 | 0.1004 | 1.5556 | 1.5549 0.3518 | 1.7152 0.7617 |
| 0.20 | 0.2005 | 1.6250 | 1.6239 0.4273 | 1.9661 1.0459 |
| 0.30 | 0.3004 | 1.7143 | 1.7137 0.5229 | 2.2533 1.2672 |
| 0.40 | 0.4006 | 1.8333 | 1.8365 0.6518 | 2.5867 1.4663 |
| 0.50 | 0.5003 | 2.0000 | 2.0022 0.8184 | 2.9838 1.6732 |
| 0.60 | 0.6003 | 2.2500 | 2.2543 1.0805 | 3.4895 1.9453 |
| 0.70 | 0.7004 | 2.6667 | 2.6746 1.5057 | 4.1923 2.3431 |
| 0.80 | 0.8000 | 3.5000 | 3.5113 2.3585 | 5.3407 3.0836 |
| 0.90 | 0.8995 | 6.0000 | 5.9918 4.7571 | 8.2555 5.3156 |
| 0.95 | 0.9499 | 11.0000 | 10.7504 9.4069 | 13.5251 9.9712 |

FIG.10

| COMPARISONS OF AVERAGE DELAY AND DEVIATION OF DQRAP WITH VARYING MINISLOT NUMBER | | | | | |
|---|---|---|---|---|---|
| NOMINAL INPUT RATE | SIMULATED INPUT RATE | DQRAP | | | |
| | | m=3 | m=4 | m=8 | m=16 |
| | | AVG/STD | AVG/STD | AVG/STD | AVG/STD |
| 0.10 | 0.1004 | 1.7152 0.7617 | 1.6982 0.7035 | 1.6761 0.6298 | 1.6666 0.5990 |
| 0.20 | 0.2005 | 1.9661 1.0459 | 1.9218 0.9433 | 1.8747 0.9938 | 1.8567 0.7957 |
| 0.30 | 0.3004 | 2.2533 1.2672 | 2.1786 1.1326 | 2.0989 0.9938 | 2.0715 0.9490 |
| 0.40 | 0.4006 | 2.5867 1.4663 | 2.4699 1.3012 | 2.3604 1.1457 | 2.3186 1.0926 |
| 0.50 | 0.5003 | 2.9838 1.6732 | 2.8097 1.4639 | 2.6564 1.2899 | 2.6052 1.2364 |
| 0.60 | 0.6003 | 3.4895 1.9453 | 3.2445 1.6836 | 3.0400 1.4961 | 2.9795 1.4434 |
| 0.70 | 0.7004 | 4.1923 2.3431 | 3.8413 2.0288 | 3.5808 1.8361 | 3.5015 1.7911 |
| 0.80 | 0.8000 | 5.3407 3.0835 | 4.8690 2.7636 | 4.5353 2.5939 | 4.4367 2.5491 |
| 0.90 | 0.8995 | 8.2555 5.3156 | 7.5451 5.0126 | 7.1088 4.8637 | 7.0018 4.8503 |
| 0.95 | 0.9499 | 13.5251 9.9712 | 12.5975 9.6747 | 12.1022 9.5977 | 11.9715 9.5731 |

FIG.11

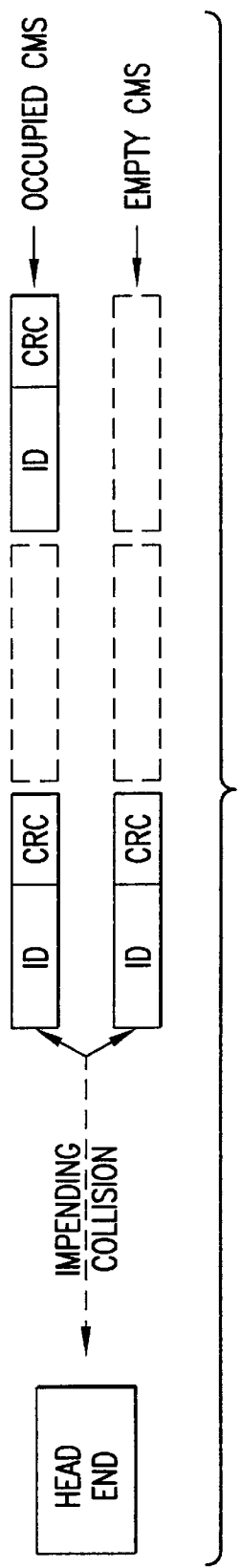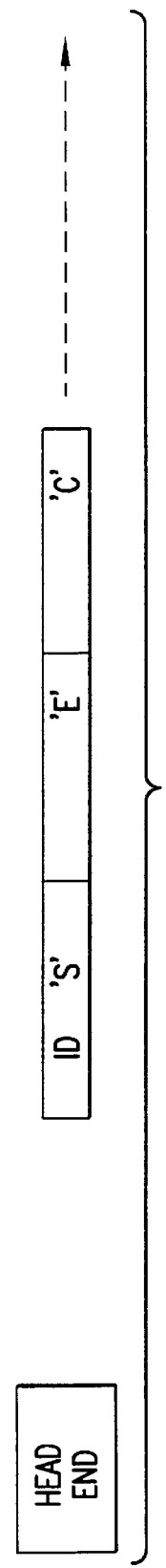
FIG.21a
FIG.21b

METHOD AND APPARATUS FOR DETECTING COLLISIONS ON AND CONTROLLING ACCESS TO A COMMUNICATIONS CHANNEL

CROSS-REFERENCE TO RELATED APPLICATIONS

This application is a continuation of application Ser. No. 08/476,426 filed Jun. 7, 1995, now abandoned.

This is a continuation-in-part of U.S. application Ser. No. 08/346,156, filed Nov. 29, 1994, now abandoned which is a division of U.S. application Ser. No. 08/073,206, filed Jun. 4, 1993, now U.S. Pat. No. 5,390,181.

BACKGROUND OF THE INVENTION

1. Field of the Invention

This invention relates to a method for detecting collisions in a transmission channel which is accessed by stations using a distributed queueing random access protocol (DQRAP) wherein broadcast channel time is divided into a plurality of slots, each of which includes one data slot and one or more control minislots, and each sending station maintains two common distributed queues. One queue, the data transmission queue, is used to organize the order of data transmission, and the other queue, the collision resolution queue, is used to resolve collisions that have occurred and to prevent collisions by new arrivals. The protocol includes data transmission rules, request transmission rules and queueing discipline rules. In an alternative embodiment a station employing the two distributed queues also can send a control minislot containing a destination identifier and a data slot length indicator.

2. Description of Prior Art

Investigation of multiple, random access control methods has been an active research area since as early as 1970. The well known CSMA protocols were then developed and later followed by multiple access methods which utilized various forms of feedback to improve performance by reducing or avoiding the occurrence of collisions. These included collision resolution schemes, now called tree-and-window collision resolution algorithms (CRA). The CSMA protocols achieved high throughput with minimal delay with low offered loads, and they have gained wide application in local area networks. In fact with zero propagation delay, collisions in slotted CSMA can be completely avoided and the performance of CSMA then corresponds to that of a perfect scheduling protocol, such as an M/D/1 queue. However, the CSMA protocols are not stable when traffic is heavy and while dynamic control mechanisms can improve performance, the unstable nature cannot be changed.

The first CRA included a tree algorithm which achieved maximum throughput of 0.43, and was stable for all input rates of less than 0.43. This stable characteristic of the tree algorithm has attracted much attention in both the communications and information theory areas. The tree algorithm was improved by increasing the maximum throughput to 0.462. The next improvement was the 0.487 window protocol. The tree and window protocols are based on efficient use of channel feedback to resolve collisions and require transmitter coordination. It has been shown that the upper bound of throughput of all algorithms based on ternary feedback is 0.568, the tightest upper bound to date.

It is widely believed that the best achievable throughput is in the neighborhood of 0.5. If the amount of channel feedback is increased to indicate the number of packets involved in each collision, then throughput up to one may be achieved. However, the known algorithms in this context achieve only 0.533 throughput. Some known protocols achieve higher throughput than 0.5 by using control minislots (CMS) to obtain extra feedback. Among such known protocols, the announced arrival random access protocols (AARA) achieve the best performance with respect to throughput and delay characteristics. With three minislots the AARA protocol achieves a throughput of 0.853. However, to achieve throughput approaching one, the AARA protocol must use an infinite number of minislots. Obviously, the AARA protocols do not achieve or approach the bound of performance in this context. All existing tree protocols seem to use data slots to resolve collisions. In this process, channel capacity is lost either to empty slots or to collisions. All suggested improvements to tree protocols increased the channel throughput by reducing empty slots and collided slots, but none eliminated this type of loss.

It has been known for some time that digital data can be transmitted over serial and broadcast media. A problem continuously faced by the designer of digital data communication equipment is efficient utilization of the transmission and receiving equipment as well as efficient utilization of the medium or channel over which the data is to be transmitted and received. A number of approaches have been developed in the past, most of which suffer from one or more drawbacks. One of the earlier well-known digital data control systems is the Aloha System, originally developed for a packet radio application at the University of Hawaii and put into public use more than twenty years ago. The Aloha System, in its pure form, is based upon a broadcast transmission followed by a listening period for an acknowledge signal from the receiving station. If no acknowledge signal is received, the transmitting station then retransmits randomly until it receives an acknowledgement signal indicating that successful transmission has been achieved. The Aloha System, in its pure form, allows variable length data slots or frames to be transmitted. However, Aloha suffers from the drawback that, on average, its Aloha maximum efficiency is about 18%.

An improvement over the pure Aloha system is slotted Aloha, which fixes the periods for data transmission to a fixed time or a slot time, also known as a data slot. The system uses the same transmission followed by acknowledgement as the pure Aloha but, due to the use of the fixed length data slots, achieves, maximally, up to 36% efficiency in channel utilization. CSMA systems have been developed which are useful for relatively short length systems, where "a", which is the ratio of the signal propagation delay to the time duration between the beginning of frame or slot transmission and the termination of frame or slot transmission, is less than 0.5. In those systems, CSMA is attractive. In order to practice the CSMA protocol, each station sharing a broadcast or other medium "listens" to the medium and does not initiate a transmission unless its response to listening indicates that the channel is currently unoccupied by a transmission from any other station. Such systems, however, do not achieve high throughput, in part because the maximal dimension of the system is dictated by the propagation delay to frame length ratio. This does not provide for efficient channel utilization.

The CSMA/CD system provides an improved and more efficient protocol over that of the CSMA system because the CSMA system, upon hearing a collision occurring, backs off for a period of time determined by an exponential back-off algorithm which is executed in appropriate software or hardware logic.

A significant improvement over the prior systems involves a digital protocol wherein a number of nodes, or stations, may all be connected to a single broadcast medium, whether wired or wireless, or may be connected in a star configuration or other configurations. Each of the stations includes a nodal apparatus which has a storage which may include a memory for storing a conflict resolution queue and a transmission queue. The system is a slotted system in that periodically, and at regular intervals, one or more control minislot signals may be transmitted from a particular station followed by a data transmission in a data slot in response to conditions in the conflict resolution queue and in the transmission queue. Such a system achieves significantly improved utilization of the channel capacity, in some cases, approaching 1.00 of the channel capacity.

One of the drawbacks of such a distributed queue random access protocol system, which is disclosed in Xu, Wenxin, "Distributed Queuing Random Access Protocols for a Broadcast Channel," Illinois Institute of Technology, Chicago, Ill., December, 1990, and U.S. Pat. No. 5,390,181, lies in the fact that for certain systems, such as local area network systems which not only have bursty transmission, but have transmission wherein the amount of data to be transmitted may vary significantly from time to time. Thus, if the fixed length data slot used in the basic distributed queue random access protocol is employed, there may be some channel inefficiencies which result due to the data slot not being entirely filled by a particular data transmission, thus causing some wastage of channel capacity. Likewise, inefficiency may result because a frame longer than the data slot must be segmented and, of course, associated with its own respective control minislots which effectively add unneeded overhead. What is needed is a system which employs conflict resolution queues and transmission queues in combination with a flexible data slot assignment and control system to enhance further the inherent efficiencies in the distributed queue random access protocol system.

SUMMARY OF THE INVENTION

It is one object of this invention to provide a method for controlling multiple access of a transmission channel through the detection of collisions by comparing a plurality of different patterns within a control minislot.

It is another object of this invention to assign different Binomial coefficients to a plurality of sending stations and to use such Binomial coefficients to detect collisions.

It is still another object of this invention to use a distributed queueing random access protocol in various system, such as with packet radio, satellite, broadband cable, cellular voice, and other passive optical networks.

The distributed queueing random access protocol (DQRAP) of this invention is a stable random multiple access protocol for use in a broadcast channel shared by an infinite number of bursty stations. The DQRAP according to this invention is based on tree protocols with minislots. These tree protocols use minislots to provide extra feedback in order to reduce the number of empty and collided slots. However, the DQRAP according to this invention uses the minislots for collision resolution and resolves the data slots for data transmission. Implicitly, even though counters are often used, conventional tree algorithms use a single queue which performs as a collision resolution queue. The method according to this invention achieves the desired performance by introducing an additional queue, the data transmission queue, to schedule data transmission parallel to contention resolution and thereby nearly eliminating contention in the data slots. The DQRAP of this invention, using as few as three minislots, achieves a performance level which approaches that of hypothetical perfect scheduling protocol, such as the M/D/1 system, with respect to throughput and delay.

The present invention also relates to nodal apparatus and networks employing multiple distributed queues wherein the efficiency of channel utilization, whether on a broadcast channel, star channel or other types of channels is substantially equivalent to the offered load up to an offered load of one. In the event that the offered load is greater than the channel capacity, the inventive system allows the channel utilization to remain at one independently of offered loads of one or above, less the overhead allocated to the control minislots.

The system which provides sufficient channel utilization is a distributed queue random access protocol (DQRAP) system, wherein multiple nodes each include a memory for storing a conflict resolution queue which includes a counter that is incremented when a collision occurs during any control minislot (CMS). An index or other identification is attached to a particular count when the local station has attempted to transmit during a control minislot and detects a collision signal resulting from that control minislot. A second queue is also kept within the nodal station, which queue contains a counter that is incremented for each collision-free minislot access. An index is attached to particular queue numbers to identify the ordinal numeral, or position in the queue, occupied by the particular local station. Thus, each station maintains a conflict resolution queue with a counter having been marked to identify when the station may seek access to control minislots and a transmission queue indicating when the station may transmit during data slots. It may be appreciated that when there is no minislot collision and the transmission queue counter is zero at a local station, the station may immediately transmit its data during that data slot. Each station is further provided with a system for sending multiple data slots following the control minislot request containing a destination identifier and the length or number of data slots requested to accommodate, to some extent, variable length data sets which are to be transmitted over a long haul system.

Other advantages of the present invention will become apparent to one of ordinary skill in the art, upon a perusal of the following specification and claims in light of the accompanying drawings.

BRIEF DESCRIPTION OF THE DRAWINGS

The above-mentioned and other features and objects of this invention will be better understood from the following detailed description taken in conjunction with the drawings wherein:

FIG. 4b shows a diagrammatic view of the control minislots and the data slot being fed back to each sending station, in response to the information transmitted, as shown in FIG. 4a;

FIG. 5 is a table showing values of CRI lengths ($L_n$) as a function of different values of n;

FIG. 6 is a table showing maximum input rates and the corresponding window sizes as a function of the minislot number;

FIG. 10 is a table showing the average delay and deviation between DQRAP according to this invention and an M/D/1 system, wherein the number of minislots is equal to three;

FIG. 11 is a table showing a simulated average delay and the corresponding deviation of the DQRAP of this invention, with a varying number of minislots;

FIG. 21A is a diagram showing control minislots before a collision;

FIG. 21B is a diagram showing return from a head end unit following collision;

DETAILED DESCRIPTION OF THE PREFERRED EMBODIMENTS

Conventional multiple access protocols have proposed the use of control minislots (CMS), in addition to a dataslot (DS), to provide binary and ternary feedback in order to improve performance. Most conventional multiple access protocols have never been implemented, possibly because the improvement in performance has not been sufficient to offset the overhead of the CMS. However, Distributed Queueing Random Access Protocol (DQRAP) provides performance which approaches that of a hypothetical perfect scheduling protocol, such as the M/D/1 system, with respect to throughput and delay. DQRAP achieves this performance using as few as three CMS providing ternary feedback. The method of this invention can be achieved with several preferred embodiments for acquiring ternary feedback in a variety of media.

Figure 1:
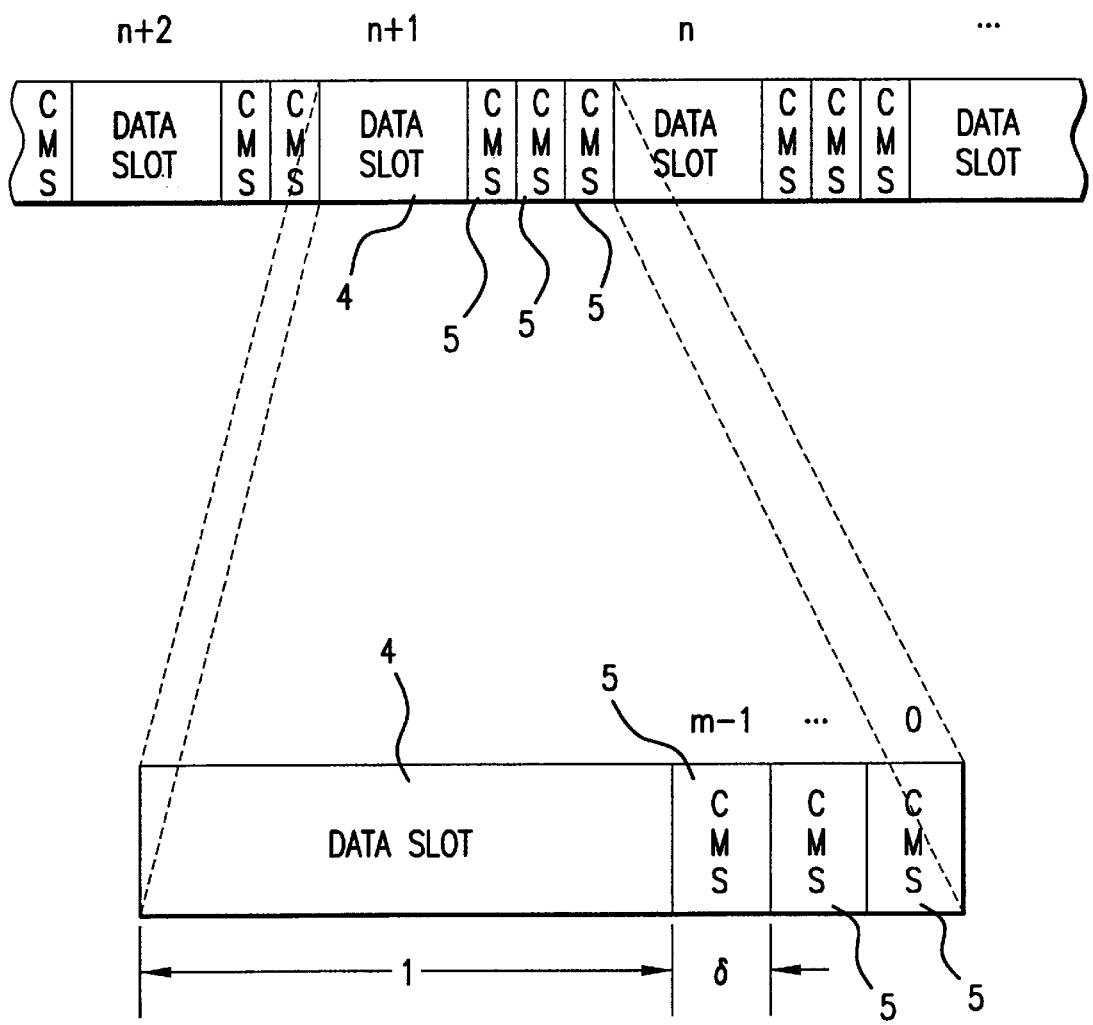
FIG. 1 is a diagrammatic representation of a slot format according to one preferred embodiment of this invention, which includes a data slot and a variable number of control minislots.

According to this invention, ternary feedback is defined as the ability of a receiver to differentiate between three conditions: (1) no signal present or an absence of a pattern; (2) a single signal present or a presence of only one pattern; and (3) multiple signals present or a presence of two or more patterns. These events occur when sending stations 2 operate under a protocol which permits sending stations 2 to transmit either arbitrarily or under rules which may allow two or more sending stations 2 to simultaneously transmit on the same transmission channel 3. FIG. 1 shows one preferred layout of DS 4 and CMS 5. The length of one CMS 5 is preferably minimized according to this invention, because if each CMS 5 requires one-third, for example, of the overall slot in a system using three CMS 5, then the entire bandwidth would be consumed by the CMS 5. According to one preferred embodiment of this invention, each CMS 5 uses a minimum of bandwidth and a receiver is able to discriminate between no transmission, one transmission, and more than one transmission in one CMS 5. Ideally, each CMS 5 should utilize something less than 1% of the slot so that overhead for a three-minislot system is well under 10%. If the viability of acquiring ternary feedback can be demonstrated, then the only obstacles to implementing the DQRAP according to this invention are those common to other conventional communications protocol.

According to one preferred embodiment of this invention, an energy level threshold ternary feedback (ELTTFB) is implemented by having each sending station 2 transmit a signal for the duration of one CMS at a power level such that the signals from sending stations 2, after normal transmission loss, each arrive at receiver 6 with the same power. The additive nature of the energy in the arriving signals indicates that a received signal level above a given threshold can be treated as a collision. This is feasible in a fiber optic environment when information is transmitted by turning the light source on and off. In a fiber optic system, it appears feasible to assign a CMS duration of about three or four bit times. This implies an overhead of about 12 bits added to a sample asynchronous transfer mode (ATM) cell, having 424 bits, for overhead of 2.75%, which is well under a 10% objective for this invention.

According to another preferred embodiment of this invention, combinatoric ternary feedback (CTFB) can be used, particularly in an environment where it may be difficult to implement the previously described ELTTFB method. CTFB is preferably implemented by assigning each station a value C(n,k) which represents one of a plurality of patterns when k items at a time are selected from n objects, which corresponds to the Binomial Theorem. For instance, if there are 10 stations then a coefficient of C(5,2) provides 10 different patterns, each with two '1s'. According to such coefficient C(5,2), patterns could be assigned to each sending station 24 wherein:

Station 1 transmits 11000;

Station 2 transmits 10100;

Station 3 transmits 10010;

Station 4 transmits 10001;

Station 5 transmits 01100;

Station 6 transmits 01010;

Station 7 transmits 01001;

Station 8 transmits 00110;

Station 9 transmits 00101; and

Station 10 transmits 00011.

If the receiver detects more than two '1s' arriving in one CMS 5 period, then a collision within transmission channel 3 has occurred. Such detection method is simplified according to this invention since receiver 6 looks only for the presence of a signal rather than attempting to assess whether a received signal is over or under a given threshold. The number of '1s' can be determined by counting pulses or by integrating over a time period of one CMS 5 and comparing with a threshold.

When using the CTFB method, the overhead is greater than when using the ELTTFB method but the CTFB method of this invention is still practical for many applications. For instance, in an ATM LAN with 64 stations, a coefficient of C(8,4) provides 70 different available patterns. Overhead for three CMS in an ATM Cell 24/424 is 5.67%, again well under the arbitrary overhead limit of 10%. Collisions are easier to detect with the CTFB method than with the ELTTFB method. One advantage of the CTFB method is that sending station 2 can be identified since each sending station 2 is transmitting a unique pattern.

In another preferred embodiment according to this invention, a digital logic ternary feedback (DLTFB) method is used to detect collisions. In true bus systems, signals arriving from two or more sources are physically or'ed and the signal levels are essentially summed. This aspect is assumed in the previously described ELTFB and CTFB methods. In digital systems such as 56 kbps DDS, T1, etc., separate signals are not physically combined since this would produce undefined results. Instead, logic either is used to produce a new signal depending upon the inputs or is used to gate one of the input signals to the output. The DLTFB method according to this invention is easily implemented in these systems.

The operation of the DLTFB method can be defined in practical terms using telephone terminology. Assume that a WAN network of 56 kbps leased lines is designed as a multi-drop network. In each city on the network there is a junction point at the point of presence (POP) of the interexchange carrier. The sending station in each city is connected to the interexchange circuit (IXC) at the POP via a local channel provided by the local carrier. When a sending station opts to write in a particular CMS a 00 or a 01 is transmitted, 00 representing no transmission and 01 representing a transmission. The timing, provided by the outbound circuit, is such that the two bits arrive at the POP junction at exactly the same time as the CMS arriving on the inbound IXC from another city. The logic at the junction compares the two inputs and transmits according to the following table:

| IN(1) (IXC) | IN(2) (LOCAL) | OUT |
|---|---|---|
| 00"E" | 00"E" | 00"E" |
| 00"E" | 01"S" | 01"S" |
| 01"S" | 00"E" | 01"E" |
| 01"S" | 01"S" | 11"C" |
| 11"C" | 00"E" | 11"C" |
| 11"C" | 01"S" | 11"C" |

The letters "E", "S", and "C" represent empty, successful and collision, respectively, the terms usually used in the protocols which employ ternary feedback. There are three possible inputs from the inbound IXC since there may have been a collision at a previous city on the "tree".

Three CMS require 6 bits and thus the overhead on the previously described ATM cell is 1.42%. The efficiency of the DLTFB method according to this invention permits the CMS size to be increased so as to include requests for a specific number of frames, and to include priority levels.

Where synchronization is available, the DLTFB method according to this invention is preferred. However, if synchronization on an approximately 56 Kbps or higher digital circuit cannot be guaranteed such that a sequence of two bits representing the transmission in one CMS 5 by one sending station 2 does not arrive at a common point at the same time as the two bits representing the transmission of another sending station 2, then the CTFB method according to this invention should preferably be used. The number of sending stations 2 will normally determine the size of the coefficient C(n,k) to which a number of guard bits are added to compensate for the lack of synchronization. When two CMS 5 mapped in such fashion arrive at common point, the fact that one of the slots may be one or more bits out of synchronization with the other will not matter since the resulting transmission will represent an illegal pattern or a pattern which indicates a collision. Receiver 6 then need only search in a range including the guard band for an acceptable pattern containing all zeros, or some other suitable pattern which would indicate a collision.

According to still another preferred embodiment of this invention, the carrier combinatoric ternary feedback (CCTFB) method is used to detect collisions. The CCTFB method is applicable to broadband systems which use a modulated carrier to convey digital data. Such broadband systems include CATV systems, packet radio systems, cellular radio systems, satellite systems, and fiber optic systems where a modulated carrier is used. The normal lock-on and synchronization to data of such systems introduce very high overhead values if normal data transmission is used in CMS. For instance, in a typical 9600 bps packet radio system utilizing a 450 MHz carrier the typical data lock-on and synchronization period is 10 ms–20 ms. Three such periods could sum to as much as 60 milliseconds, longer than the previously discussed ATM cell which at 9600 bps is 44 milliseconds. Aside from the overhead there is a problem with the "capture" effect prevalent in many conventional systems which utilize modulated carriers. In such a system a receiver locks onto a single received carrier, disregarding other carriers. This is a desirable trait in normal circumstances and is designed into most radio systems. But if the object is to detect the presence of two or more signals, the capture effect is disastrous.

The CCTFB method according to this invention uses the capture effect to identify the presence of two or more signals. Each station is assigned a coefficient C(n,k) pattern as previously described. Each CMS is then allocated a duration sufficient to contain n individual signals of length t. Each of the n signals are a burst of carrier of length t. If the C(n,k) pattern has adjacent '1s', then the carrier just remains turned on for each of the adjacent '1s'. Simply put, sending station 24 transmits in one CMS 5 by turning the carrier on or off according to the C(n,k) pattern. Each carrier on a period corresponding to a "1" in the pattern is of length t seconds. Receiver 6 uses conventional filtering and phase locked loop (PLL), or another suitable detection technique, to detect the carrier. For a C(n,k) system, a CMS has a basic time period of nt seconds. A transmitting station turns on its carrier for k periods of t seconds during one CMS 5 interval. Receiver 6 locks onto the arriving carrier and either by counting cycles or integrating over the CMS period makes an estimate of empty represented by no signal present in one CMS 5, successful represented by only one signal present in one CMS 5, or collision represented by two or more signals present in one CMS 5. The carrier will be present for no transmission, present for kt seconds for a single transmission, and present for more than kt seconds for a collision.

There are two major advantages to using the CCTFB method of this invention in those systems where it is feasible. First, the period t can be less than one or two hundred cycles of the carrier. This is more than adequate for receiver 6 to detect and lock on. Most carriers of interest operate at frequencies higher than 20 MHz. A period t of 200 cycles at 20 MHz takes 10 microseconds. Even in a C(n,k) system where n=16, the CMS 5 time period would be: 16×10 microseconds ($\mu s$)=0.16 milliseconds (ms), for a total of 0.48 ms. This means that slots can be as short as 10 ms and an overhead constraint of less than 5% would be satisfied. As the carrier frequency increases, the data carrying capacity is increased. However, frame sizes usually remain at the same size making the duration of the data slots shorter. One advantage of the CCTFB method of this invention is that as the carrier frequency increases, the time duration of the CMS, at 200 cycles, is reduced so that the overhead remains proportionally the same. In fact, at speeds envisioned in fiber optic networks the CMS overhead could become minuscule. Maximum on-off repetition rates can be set to ensure that bandwidth limits are not exceeded.

Second, the capture effect is used to an advantage. If two or more sending stations 2 transmit in the same period t(i) in one CMS 5, the capture of one signal contributes to the total count in the CMS period. The total count will then exceed the expected count of k. If there is interference and neither signal is received, then the decision about a collision must be determined from the remainder of the signal. However, with a C(8,4), the minimum practical value of n and k in one preferred embodiment of this invention, the probability that two or more colliding patterns in one CMS 5 will result in a count of 4 is relatively low, even if the capture effect fails.

In EITFB (error indication ternary feedback) used in a non-baseband or broadband system, e.g., a radio-frequency environment, the carriers of separate CMSs are not synchronized, thus the colliding signals will vary with varying phases. Using the energy of the combined received signal would not be a reliable indicator of a collision. There are two solutions to the problem: (i) the combinatoric ternary feedback system disclosed in U.S. Pat. No. 5,390,181 and (ii) letting the CMS transmission consist of the minimum size data message possible in the system. The message will include a preamble that allows the receiver to lock onto the received signal, a sync field that delineates the bytes in the message, the data field which should be unique to each station, and an error checking code, such as a cyclic redundancy check (CRS). However, this is not foolproof since the CRS will detect 100% of 1 and 2 bit errors but may fail at a rate of one in $2^N$ occurrence of burst errors where N is the number of bits in the CRC. The cyclic redundancy check is the best and most practical of the available error detecting mechanisms; others using arithmetic check sums or parity checks fail with a higher frequency, especially when burst errors are involved. We modify the DQRAP operation to compensate by requiring that the CMS include the identification (ID) of the transmitting station and that ID is subsequently included with normal feedback. Use of a combinatoric pattern of the type disclosed as CTFB as the ID and the use of digital signal processing techniques will confirm the presence of a collision indicated by CRC failure. Absence of a signal in the CMS slot indicates an empty CMS. Arrival of a single transmission with no error indicates a single transmission. A collision is assumed to occur when (a) energy is detected and (b) an attempt is made to "read" a message and (c) the error check results in an error. This use of error indication feedback may increase the size of a control minislot relative to CTFB and DDLTFB, probably to the equivalent of 8–10 bytes. This, however, is not a major problem for most environments. This message can be made reliable with DQRAP when used in topologies where all nodes transmit to a central node and thence the feedback is broadcast from that single node back to all nodes. An ID unique to the originating station is included in the control minislot. This can be the unique ID used in CTFB. The central site determines the status of the CMS slot, i.e., successful or collision. If successful, the central station transmits an indication of such success along with the ID carried in the control minislot. If a collision occurs, then this is so indicated in the feedback.

The possibility exists of incorrectly identifying the state of a CMS. The following conditions could occur:

1: Success→collision. A single transmission that is corrupted by noise and is read as a collision. Result: The transmitting station enters the RQ and exits after one cycle. Minor delay in reservation cycle.

2: Collision→success. Two or more arriving messages collide with resulting burst errors not caught by the CRS. An "S" is transmitted in the feedback along with is essentially a random ID. Two possibilities:
  (a) the ID does not represent a transmitting station. No action is then taken by any station or
  (b) the ID represents a transmitting station. That station proceeds as normal.

This latter condition feature also overcomes the problem with capture, i.e., when two or more stations transmit, but the receiver only receives one signal. Conventional DQRAP fails in the circumstance in that a positive feedback is sent back and every transmitting station then transmits its data when it reaches the front of the front of the queue.

3: Success/collision→empty. This condition can be due to fading in a single signal or two signals arriving 180° out of phase. In this instance, the transmitting station is transmit again in the next slot.

4: Empty→collision. Stations increment the RQ and one slot is unused.

Digital combinatoric ternary feedback (DCTFB). In most digital systems, the default value transmitted when there is no data is a logical 1. This logical 1 is most often represented by a pulse where the logical 0 is represented by the absence of a pulse. If two such circuits are joined by physically tying them together, then a circuit carrying no data that 1s all is when tied to a circuit carrying data, that is a mixture of 1s and 0s would result in no data, i.e., all 1s. To ensure that the output line carries the data present on one of the input lines, each input line is fed to an input of a logical AND circuit such that the output is shown in Table 1:

TABLE 1

| IN(1) | IN(2) | OUT |
|-------|-------|-----|
| 000   | 000   | 000 |
| 010   | 010   | 010 |
| 100   | 100   | 100 |
| 111   | 111   | 111 |

In the typical multi-point digital circuit, operating under control of distributed queue random access protocol the topology is tree-and-branch, but could include folded bus or star topologies. A head end or temporarily selected station periodically transmits both the timing marker and the ternary feedback of the previous inbound control minislot. All stations listen for the marker and feedback and then using DQRAP rules, transmit if ready during a controlled minislot and/or data slot. If combinatoric ternary feedback is utilized, then all that is required at each junction is an AND gate.

Figure 24:
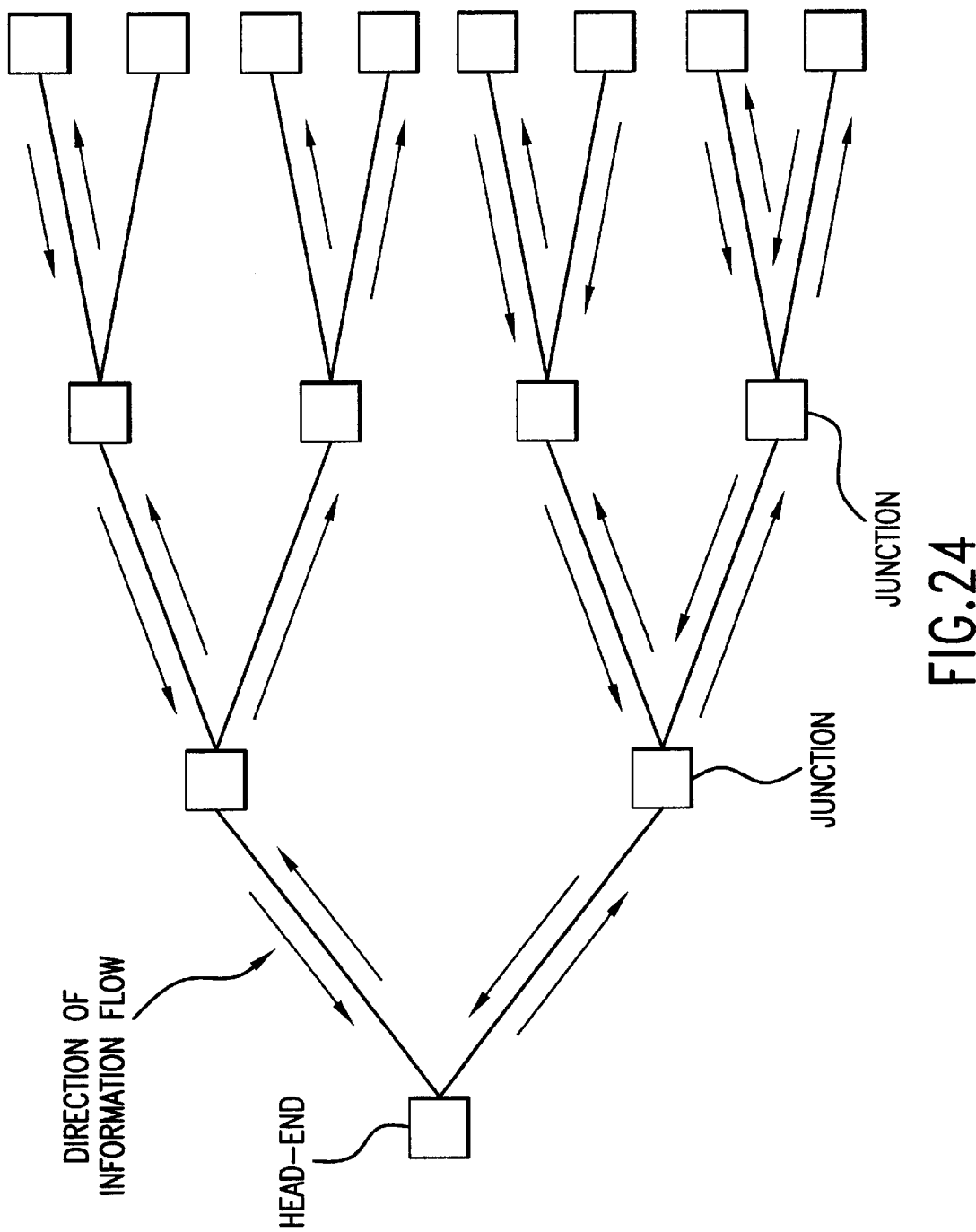
FIG. 24 is a tree diagram of stations coupled ultimately through a head-end station.

DQRAP can be implemented on a WAN (wide area network) consisting of DS1 (1.544 Mbps, net 1.536 Mbps) leased lines designed as a multi-point network using a tree-and-branch topology. FIG. 24 is a logical representation of such a network. In each city in such a network there is a POP (point of presence) where the long distance carrier brings lines from other cities to a common point. Circuits from local offices are also collected at the POP. All the lines are joined through a series of "and" circuits. FIG. 24 represents junctions that connect stations that may be thousands of miles apart. Obviously, different stations will "hear" the common timing marker at different times but to follow the rules of DQRAP they must transmit into a CMS such that their signal (a) does not interfere with adjacent CMS and (b) overlaps exactly a signal already present in the CMS. We next describe how this is accomplished.

Figure 25:
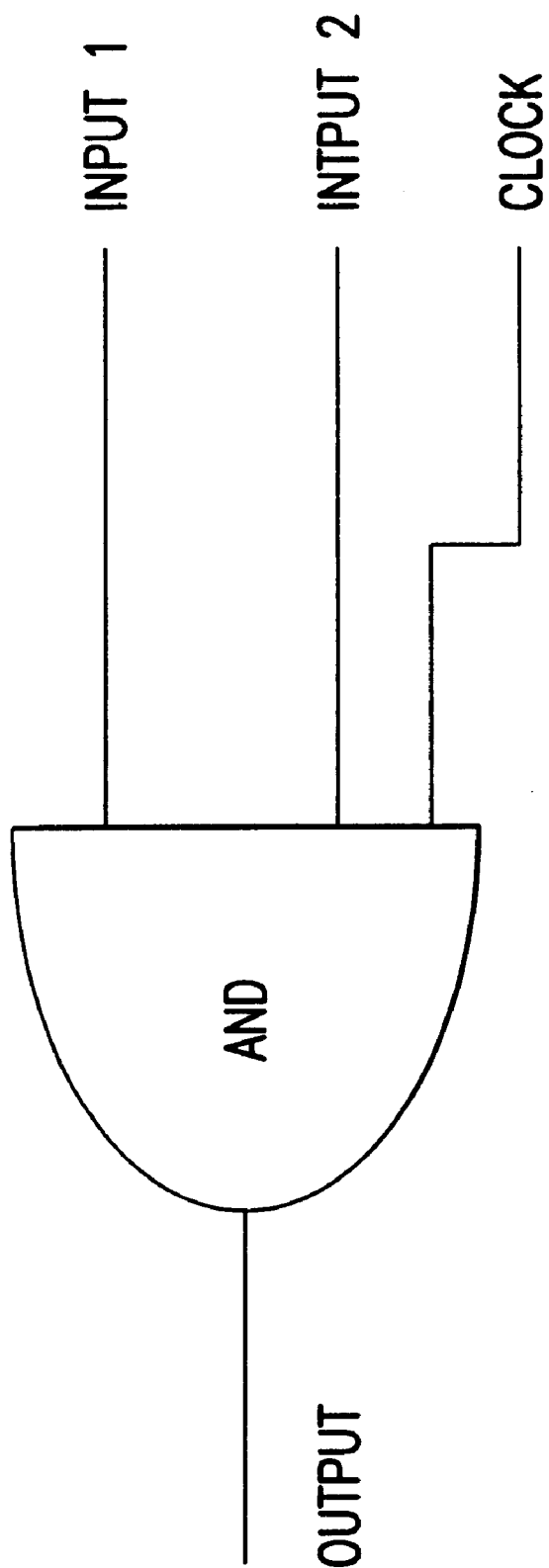
FIG. 25 is a schematic showing an AND gate circuit.

DQRAP requires that a station synchronize on a marker transmitted by the active controller (usually the head-end) station). In any practical network, the distribution of the stations means that each station will "hear" the marker at a different time. A ranging process must be carried ut to ensure that when a station, following DQRAP rules, desires to transmit into a specific CMS that station's transmission does not interfere with transmissions in adjacent CMSs. Very briefly, a station transmits a message to the head-end that is turned around after a fixed delay, the elapsed time allows the station to calculate the distance from the head-end. The station is also informed by the head-end of the maximum distance of the most distant station. Using this information, each station calculates the amount of time to wait after receipt of the timing marker before transmitting into a CMS. When each station applies its delay factor, it ensures that patterns transmitted by two separate stations into a common CMS will arrive at the "and" gate as shown in FIG. 25.

Using the results of the ranging process, DQRAP can now be implemented in digital circuits using combinatoric ternary feedback (CTFB). A CMS size is selected that will support unique patterns for all stations on the network. Two stations writing into a common CMS will result in a non-standard pattern and, thus, a collision is detected.

In DDLTFB (Delayed Digital Logic TFB), the size of each CMS in DCTFB will be at least 10–12 bits since the desire for a standard size will mean that even if a network only has a few stations, the CMS size will be set large enough so as to make software transferrable or to allow for expansion. We now describe a mechanism that allows the size of a CMS in DQRAP to be reduced to two bits.

When a station opts to write in a particular CMS so as to reserve a dataslot according to the rules of DQRAP, the station writes 01 (where the "0" is the leading bit) into a CMS. The timing provided by the system by means of a ranging process as described in 2.3.1, is such that the two bits of a given CMS arrive at the POP junction at exactly the same time as the two bits of a CMS arriving from another local office or on an IXC circuit from another city. The logic at the junction accepts inputs from two inbound lines and produces output according to the results shown in Table 2.

TABLE 2

Input-Output for DDLTFB Junction

| IN(1) (IXC or Local) | IN(2) (IXC or Local) | OUT |
|----------------------|----------------------|-----|
| 11"E"                |                      | 11"E" |
| 11"E"                | 01"S"                | 01"S" |
| 01"S"                | 11"E"                | 01"S" |
| 01"S"                | 01"S"                | 00"C" |
| 00"C"                | 11"E"                | 00"C" |
| 00"C"                | 01"S"                | 00"C" |
| 00"C"                | 00"C"                | 00"C" |
| 11"E"                | 00"C"                | 00"C" |
| 11"E"                | 01"S"                | 01"S" |
| 10"Error"            | 10"Error"            |     |

The letters "E", "S" and "C" represent empty, successful and collision, the terms used in DQRAP to specify the state of the ternary feedback. There are four possible inputs on each of the circuits, but one is an error condition. Thus we have (4−1)×(4−1)=9 possible outputs. Note that the bits in each input pair arrive sequentially and the output bits are transmitted sequentially.

The major problem in implementation is that the presence of a "0" in the leading bit of each of two arriving CMS requires that not only should the corresponding bit output be a "0" (easily accomplished with an "AND" gate), but that the succeeding output bit also be a "0". This is accomplished by delaying a copy of the output of the AND gate for one bit time and then inserting it in the inbound channel. The difficulty is that this inserting of a zero into the inbound channel must only occur after the arrival of two 0s in the first position of a CMS. All other arrivals of pairs of "0"s must pass through the "AND" gate without affecting succeeding bits. This is accomplished by the DQRAP controller that effectively implements the DQRAP logic at each junction. During the initialization process of the network, these control processors at the junction points are included in the same ranging process as the stations. The junction processor uses the delay factor such that after arrival of a timing marker transmitted by the head-end on the outbound channel the control processor knows the delay bit in times before the CMSs arrive on the two inbound lines. The processor then gates the output of the memory to the "AND" gate such that simultaneous arrival of two 0s in the first positions of each of the two CMSs force a 0 to be placed on the network inbound line in the succeeding bit position. Arrival of simultaneous 0s at other times has no effect on the succeeding bits.

Three CMSs require 6 bits, thus the overhead on our ATM cell is 1.42% using the ATM cell as the reference. DDLTFB can be used as the lead two bits in a CMS carrying other information such as (a) request for a specific number of frames and (b) priority levels. The operation is carried out "on the fly". There is no need as in some digital systems to inspect a bit and then to modify the same bit before passing it on.

Figure 26:
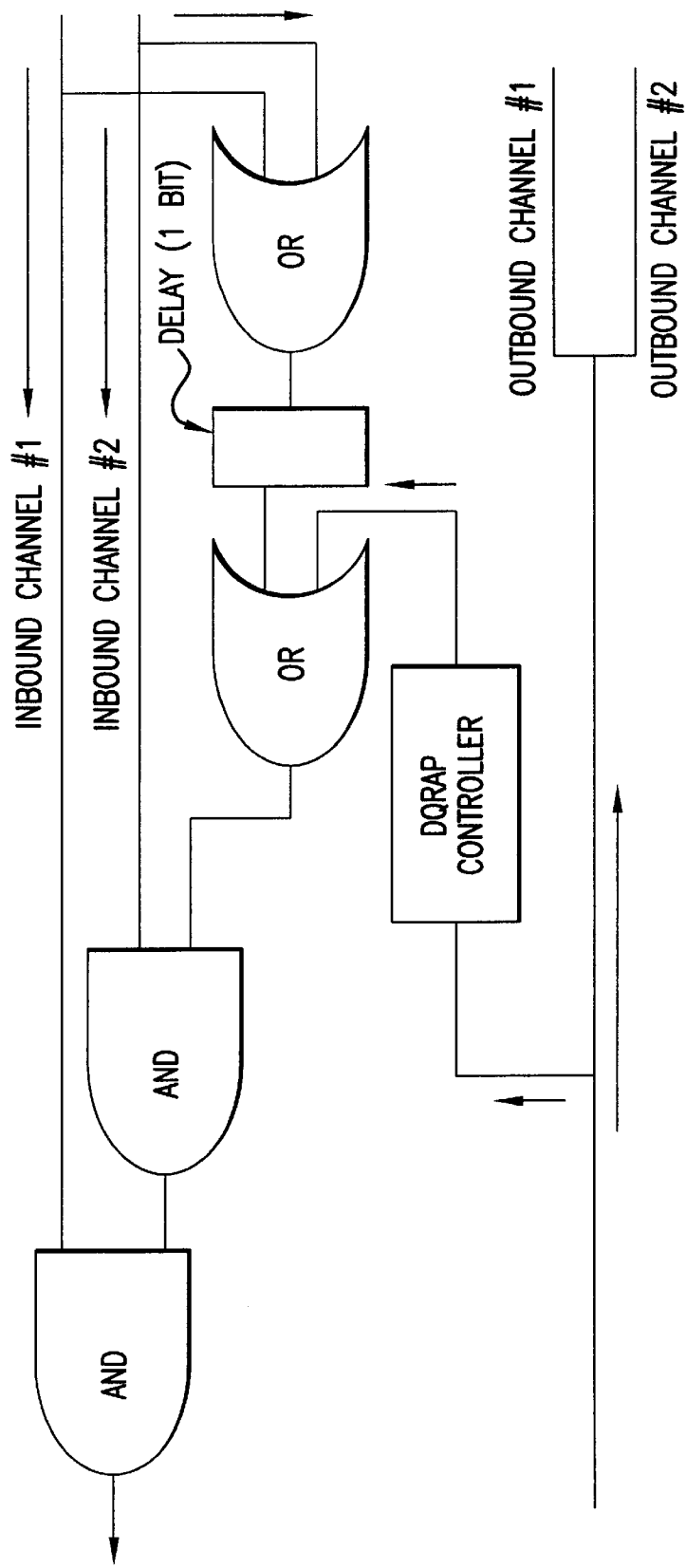
FIG. 26 is a schematic of a portion of a collision detection circuit.

The implementation of DDLTFB is the most efficient method of implementing DQRAP based upon utilization of the communications line, i.e., the overhead of three CMSs at two bits each is 6 bits. However, it does require that the two lines to be combined be brought out before going to the switch and passed through the logic in FIG. 25 or FIG. 26. The combinatoric method of section 2.2 could be implemented by modifying existing digital switches so that circuits can be joined under software control. Conventional telephone switches utilize two major components in various combinations to carry out the switching function: space-division switch and time-slot interchange switch. The design of a time-slot interchange switch may be modified so that DQRAP may be implemented on some circuits while the remainder of the circuits are switched in the conventional fashion. The following section describes how this may be done.

Figure 27:
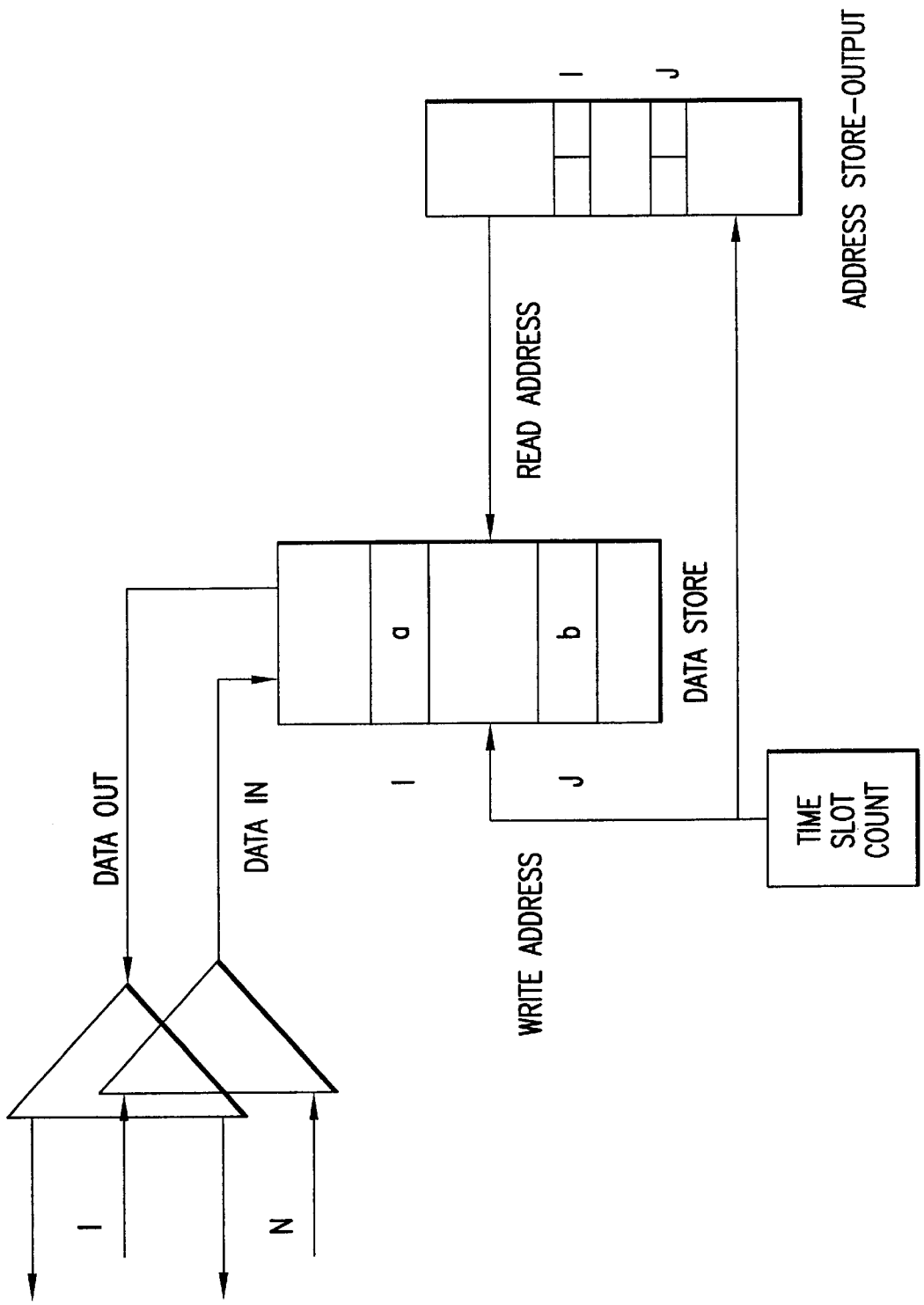
FIG. 27 is a block diagram showing details of a collision detection scheme.

DTSCTFB (Digital Time-Slot Switching Combinatoric Ternary Feedback). DCTFB using "AND" gate logic is relatively simple to implement, but it requires that individual DS1, DS2, etc., lines be brought out of the conventional switches used at switching centers, be joined via the "AND" gate as described in 2.3, and then fed back to the switch. We have devised a method whereby a time-slot switch accomplishes the merging of the two circuits with an "AND" lines operation thus obviating the requirement of bringing the lines out of the switch. FIG. 27 shows the operation of a typical time-slot interchange switch. We use the DS1 format, but the idea applies at any speed. In FIG. 27 an input line is carrying frames that each carry 24 eight-bit samples numbered 1–24 (N–24 in this case). The slots of an individual frame are read into the data store in sequential order. The outgoing frame is created by reading slots from memory in the order specified by the address store.

In the example, a switching operation has been accomplished wherein the circuit represented by slot I is output on slot J, the J is output on slot I, etc. Software control of the switch enables the slots representing various circuits on the input line to be arbitrarily switched to different circuits on the output line. This mechanism, or equivalent, is present in all time-slot interchange switches used in the phone industry.

We proposed modifying the time-slot interchange mechanism so that it can continue to carry out the switching function, but will also be able to joint two circuits with the equivalent of an "AND" operation. DQRAP ensures that the data exists only on one line. However, the combining of two CMSs will, when each CMS carries a distinct pattern as described be DCTFB, result in a pattern that a receiver can distinguish as "E", "S" or "C".

Figure 28:
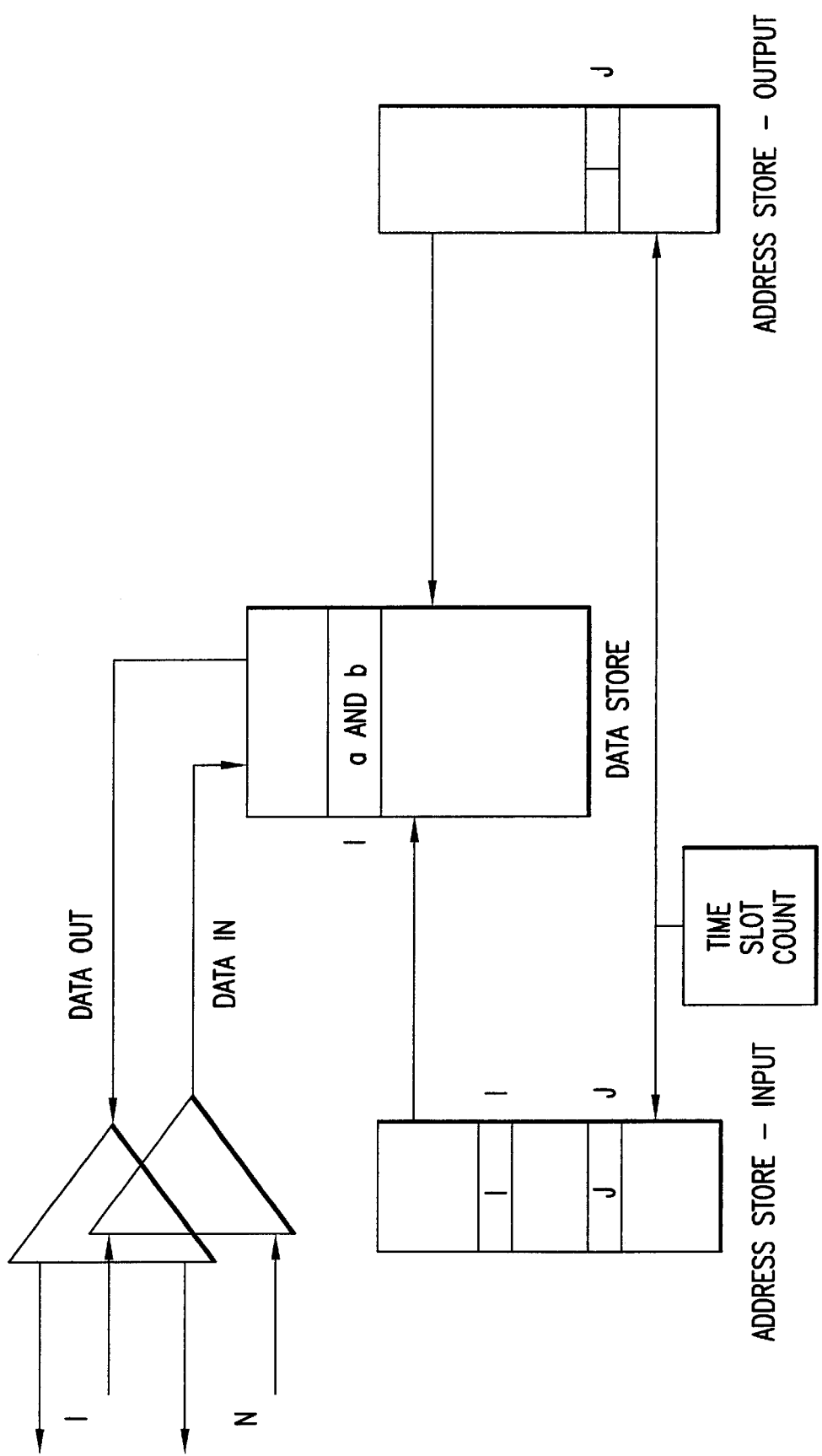
FIG. 28 is a block diagram showing details of a collision detection scheme.

FIG. 28 shows the operation of a time-slot interchange switch modified to support DTSCTFB. We see here the same input as in FIG. 7, but now we see that the data, a and b in slots I and J, respectively, are written into slot J. The key here is that the output buffer is automatically initialized to all is and each write of an incoming slot is an "AND" operation. The resulting pattern will, when the input signals follow the CTFB method of section 2.2, indicate whether a collision has occurred in a CMS.

The preferred methods of this invention are particularly suitable for use with a communication system accommodating or serving an infinite number of sending stations 2 or bursty stations which communicate over a multiaccess and noiseless broadcast channel. Sending stations 2 preferably generate single messages of fixed length. Transmission channel 3 is preferably divided into slots of fixed length. As shown in FIG. 1, each slot comprises a variable number m of CMS 5 followed by a single DS 4. The size of one DS 4 is assumed to be of length 1, equal to the length of messages generated by each sending station 2. Each CMS 5 is assumed to be of a length δ. The size of δ is implementation dependent but δ is assumed to be much smaller than the corresponding DS 4, δ<<1. (1+mδ) is defined as a channel time unit (CU). Assume, for example, that the generation times of the messages form a Poisson point process with intensity of λ messages per unit time. λ is also called input rate. One sending station 2 may transmit a message in DS 4 and/or a request in one CMS 5. All sending stations 2 can synchronize both CMS 5 and DS 4 boundaries and all sensing stations 2 can detect ternary feedback information for each CMS 5 and each DS 4 from transmission channel 3 immediately after transmission. The assumption of immediate feedback is unrealistic, however, the collision resolution algorithms can be modified to accommodate delayed feedback.

Figure 4A:
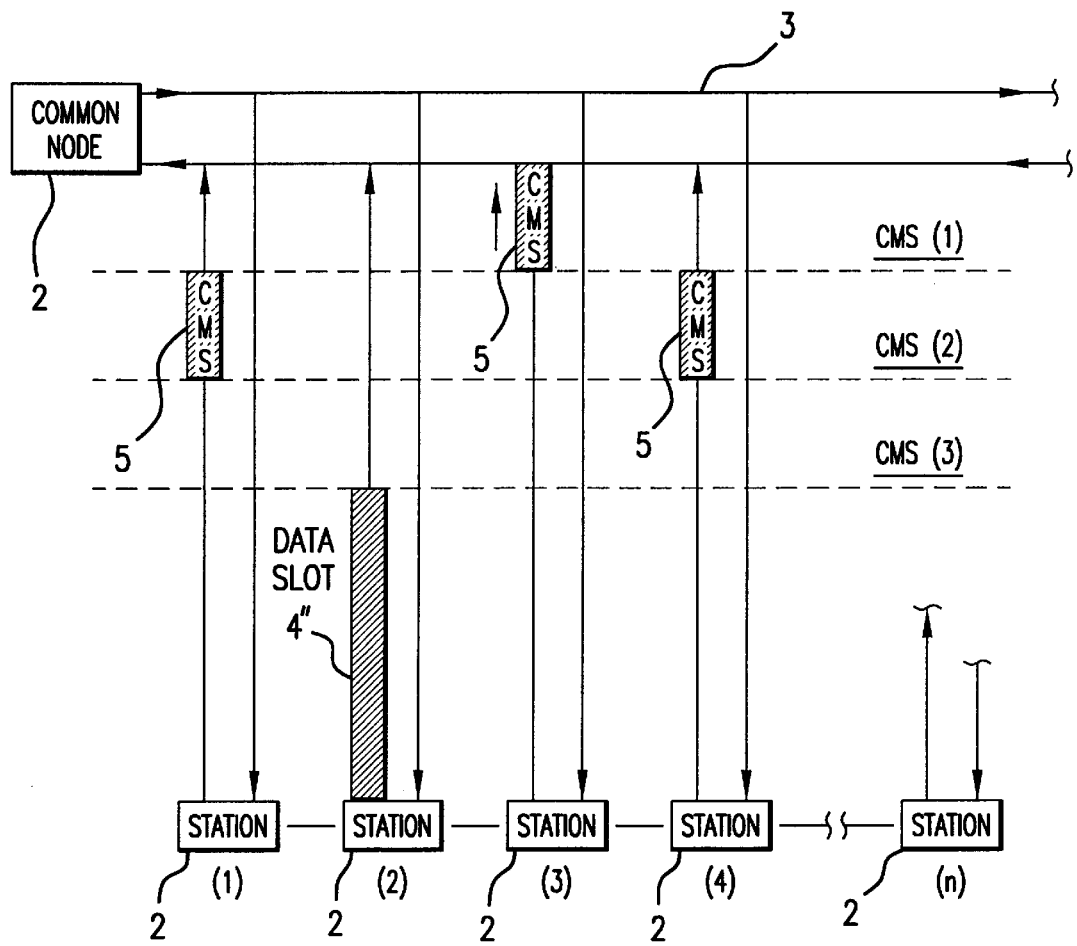
FIG. 4a shows a diagrammatic view of sending stations transmitting control minislots and a data slot during one slot time, according to one preferred embodiment of this invention.
Figure 4B:
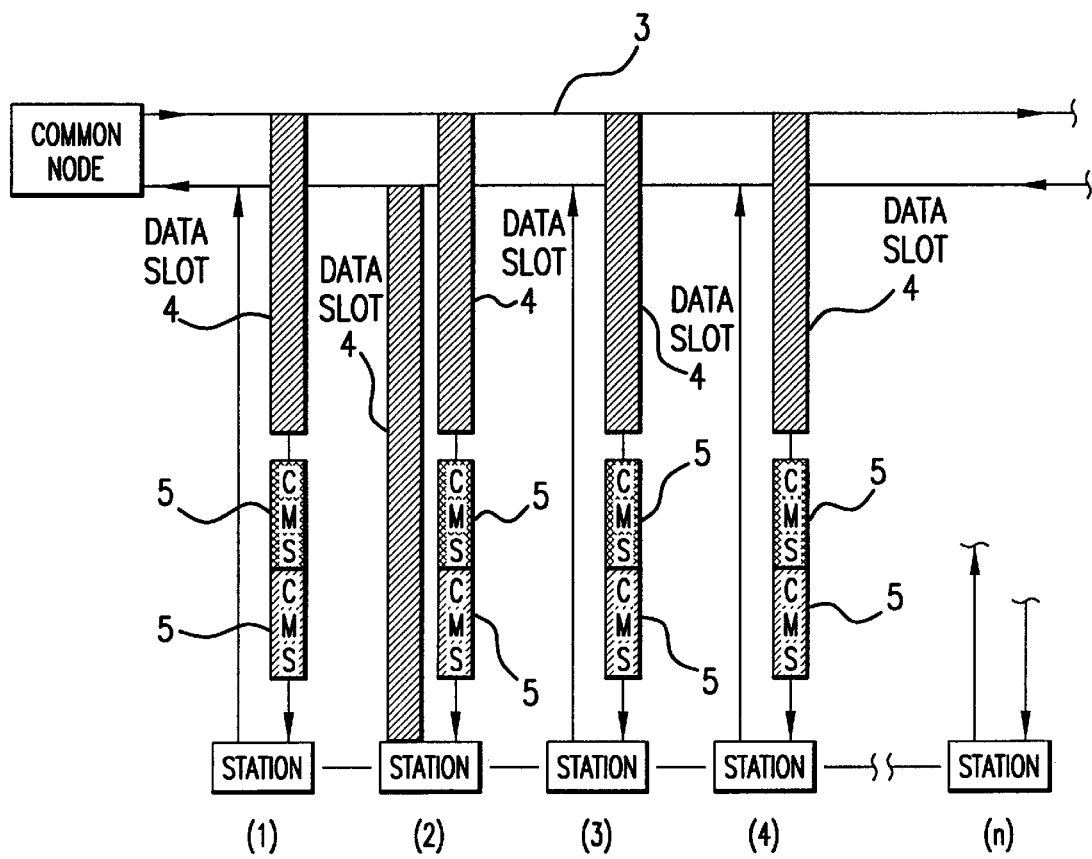

FIGS. 4a and 4b show a schematic representation of a topology wherein detecting the state of each CMS 5 can be accomplished at either common node 20 or at sending stations 2. It is apparent that a base node, a base station or the like, as well as any suitable passive or active element, can be used in lieu of common node 20. If common node 20 is used to determine the status of CMS 5, it then transmits a two bit pattern representing the ternary feedback results of each CMS 5 to sending stations 2. In such method according to one preferred embodiment of this invention, the technology required to ascertain the status of CMS 5 need only be built once. Such preferred method of this invention can also be used as a default method in systems where sending stations 2 always transmit to a central data base rather to other stations.

Figure 2A:
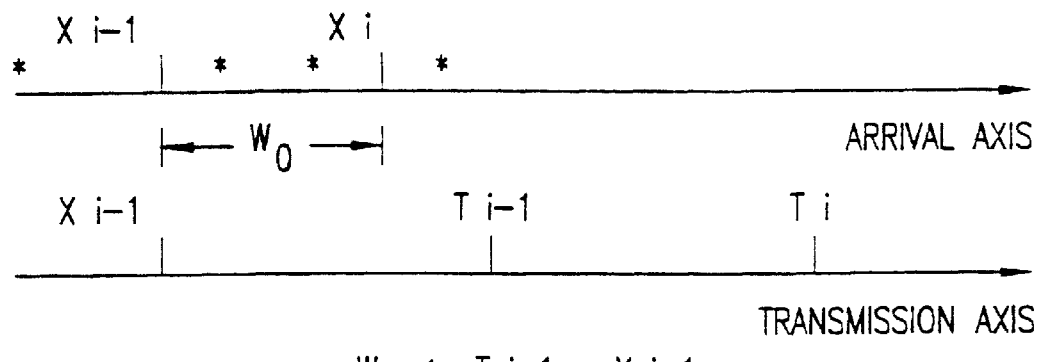
FIGS. 2a and 2b are diagrammatic representations of sequenced events for an enable transmission interval (ETI) and a contention resolution interval (CRI)
Figure 2B:
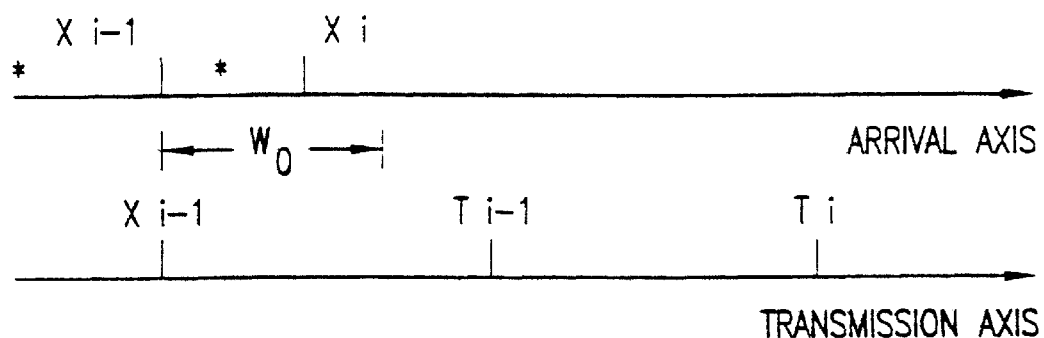

The basic principle of the tree collision resolution algorithm is to resolve one initial collision before trying to resolve another one. In order to decouple transmission time from arrival time, $t_{i-1}$ represent the instant in the transmission axis that all messages have arrived before the instant of $X_{i-1}$ in the arrival axis and have successfully resolved their conflicts, as illustrated in FIGS. 2a and 2b. The interval $(x_{i-1}, t_{i-1})$ is called the waiting interval. The interval $(x_{i-1}, x_i)$ is called the enable transmission interval (ETI), which is determined from the following formula:

$$x_i = x_{i-1} + \min\{W_0, t_{i-1} - x_{i-1}\} \qquad \text{Eqn. 1}$$

where $W_0$ is called the default window size which is optimized by performance requirements. Obviously, if the length of a waiting interval is greater than the default window size, the ETI is part of the waiting interval, as shown in FIG. 2a, otherwise the ETI is equal to the waiting window, as shown in FIG. 2b.

In the DQRAP according to this invention, collision resolution is based on the ETI. Only after all messages in the current ETI have successfully resolved their conflicts can the next ETI be initiated. If an instant ti all messages in the ETI $(x_{i-1}, x_i)$ have successfully resolved their conflicts, the interval $(t_{i-1}, t_i)$ is called the contention resolution interval (CRI) corresponding to ETI $(x_{i-1}, x_i)$. In the DQRAP of this invention, two distributed queues are maintained by each sending station 2: the data transmission queue, or simply TQ, and the collision resolution queue, or simply RQ. |TQ(t)| and |RQ(t)| represent the que lengths of TQ and RQ at the instant t, respectively. The phrase "transmit a request" means that a station rolls an m-sided die and transmits a request signal in the selected minislot.

Let $F_j$, where j=1,2, . . . m, denote feedback from the j-th CMS. $F_j$ belongs to the set of {E,S,C}, where E denotes an empty minislot, S denotes the presence of a single request signal in a minislot, and C denotes the presence of two or more request signals transmitted in a single minislot.

The protocol of this invention comprises three main sets of rules: data transmission rules (DTR), request transmission rules (RTR), and queueing discipline rules (QDR). A first come first scheduled (FCFS) scheduling discipline is used for both the TQ and the RQ but other scheduling disciplines could be utilized. Basically the DTR, the RTR and the QDR address the issues: (1) who can transmit data and when; (2) who can transmit requests and when; and (3) how does the channel feedback affect the queues.

The following Data Transmission Rules (DTR) apply to the method of this invention:

(1) If (|TQ(t)|=0&&|RQ(t)|=0) then sending stations 2 with messages which have arrived in the current ETI transmit messages in DS 4 at time (t); and (2) If (|TQ(t)|>0) then sending station 2 which owns the first entry in the TQ transmits its message in DS 4 at time (t).

The following Request Transmission Rules (RTR) apply to the method of this invention:

(1) If (|TQ(t)|=0) then sending stations 2 with messages have arrived in the current ETI transmit requests at time (t); and (2) If |TQ(t)|>0 then sending stations 2 which "own" the first entry in the RQ transmit requests at time (t).

The following Queueing Discipline Rules (QDR) apply to the method of this invention:

At time (t), using data slot or minislot feed-back:

(1) Each sending station 2 increments |TQ(t)| for each ($F_j$(j=1, . . . m)=S;

(2) Each sending station 2 decrements |TQ(t)| by one at (t) for a successful message transmission commencing (t−1);

(3) If |RQ(t)|=0 each sending station 2 decrements |RQ(t)| by n where n is the number of collisions C in $F_j$, where j=1, . . . m;

(4) If |RQ(t)|>0 each sending station 2 modifies |RQ(t)| by (n−1) where n is the number of collisions, C, in $F_j$,j−1, . . . m; and (5) Sending stations 2 which transmit successful requests or collided requests know their position in the TQ or the RQ and adjust their pointers or counters to the TQ or the RQ accordingly.

Using the rules presented above, the DQRAP according to this invention can be described by the following algorithm:

```
Set (t)=0, |TQ(t) |=0, and |RQ(t) |=0;
While (TRUE)
{
    1)  t=t+1
    2)  transmit data obeying the DTR;
    3)  transmit(s) request(s) obeying the RTR;
    4)  all stations modify their counters of the TQ and the RQ
        and their pointers to the TQ or the RQ following the QDR.
}
```

DTR(1) described above is important since it preserves the immediate access feature of random multiple access communications and distinguishes the DQRAP of this invention from reservation protocols. It is emphasized that DTR(1) may permit a collision to occur in the DS, but without DTR(1) the DS would otherwise be empty. DTR(1) improves the delay characteristics of the protocol according to this invention, especially when the input rate is low.

The algorithm to resolve queueing contention in the DQRAP according to one preferred embodiment of this invention uses ternary feedback and multiple minislots.

Figure 3:
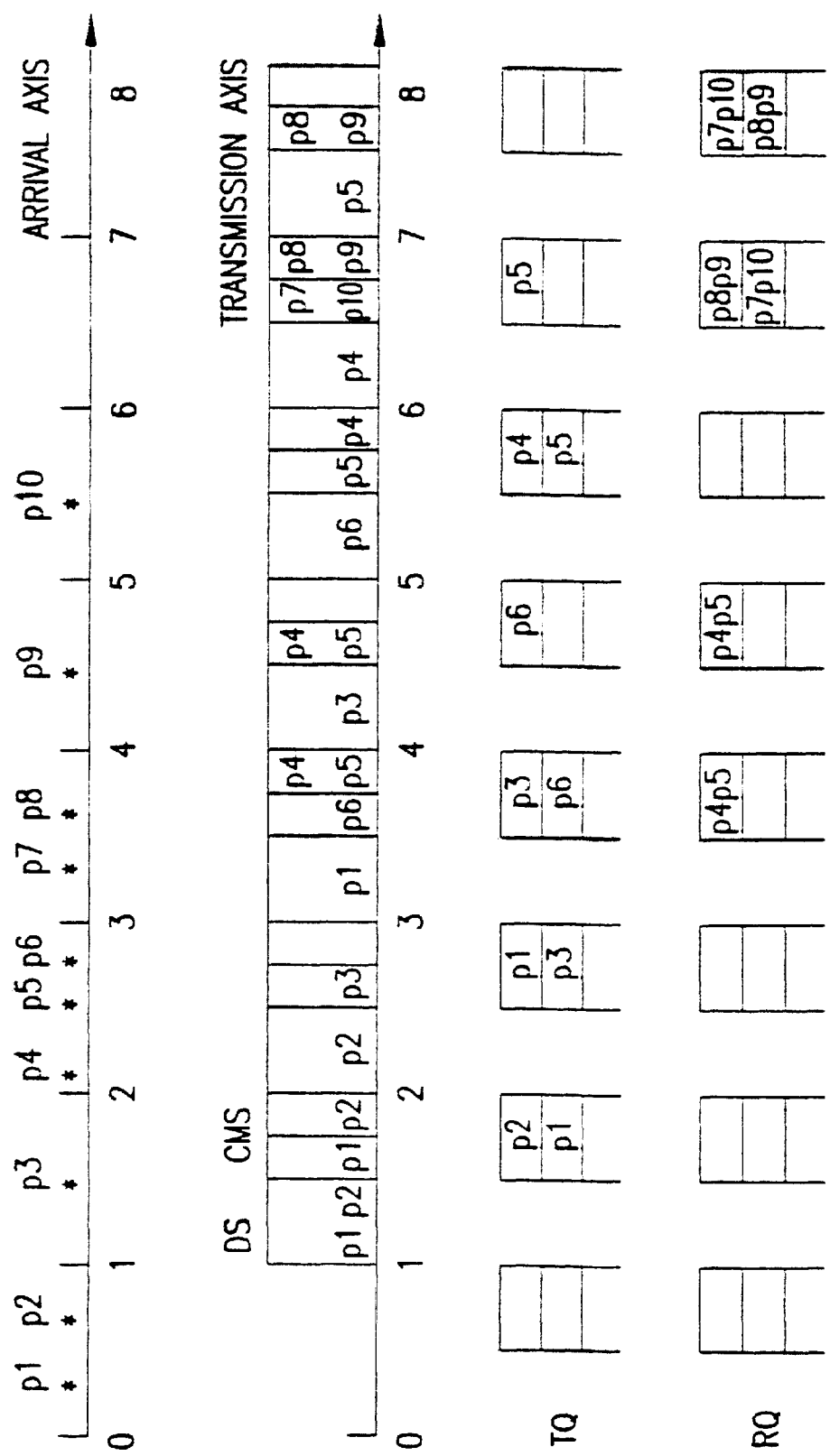
FIG. 3 is a diagrammatic view showing the operation of one preferred embodiment of a distributed queueing random access protocol (DQRAP) according to this invention.

One preferred embodiment shown in FIG. 3 describes the operation of the DQRAP of this invention. The default window size is infinite ($W_0=\infty$), for example, the ETI is equal to the waiting interval. The time axis is divided into equal slots with length of one channel unit. Above the time axis the contents of the CMS and the DS are shown in FIG. 3. Below the time axis the contents of the TQ and the RQ at each sending station 2 are shown. The asterisks denote the arrival time of message p1, p2, . . . p10. In this example two minislots are used. Assume at t=0 that both the TQ and the RQ are empty. At t=1, p1 and p2 each transmit both requests and messages. At t=2 the feedback shows that the p1 and p2 data messages have collided but their requests have not collided. p2 and p1 go into the TQ and p2 data is transmitted at t=2. Meanwhile p3, arriving in interval [1,2) transmits a request but no data since |TQ(2)|>0. p3 enters the TQ as p2 leaves. While p1 and p3 are waiting their turn to transmit data, p4, p5, and p6 transmit requests at t=3. p6's request is ok and p6 enters TQ but p4 and p5 collide and thus enter the RQ. p4 and p5 collide at t=4 on their first try to resolve the collision but on the next attempt at t=5 they succeed and enter the TQ, their order determined by their relative position in the minislots. p6 transmits at t=5 since the TO operates independently of the RQ. The RQ is empty at t=6 thus p7, p8 and p9, which arrived in the interval [3,5) and could not transmit requests or data join p10 at t=6 in making their first attempt to transmit. p8 and p9 collide in the first minislot while p7 and p10 collide in the second minislot. This determines their order in the RQ. Such process then continues.

The diagrammatic view of FIG. 4a shows one slot time wherein the preceding and succeeding slot times are not shown. In such preferred embodiment according to this invention, it is assumed that TQ>0, and sending station 2(2) is at the head of the queue. Sending stations 2(1), 2(3) and 2(4) have requests to transmit so that they randomly select one CMS 5 and transmit it as a corresponding slot time. Sending station 2(3) selects the first CMS 5(1), as shown in FIG. 4a, and is successful, while sending stations 2(1) and 2(4) collide in the second CMS 5(2). As shown in FIG. 4a, there is no transmission within CMS 5(3). Following the DQRAP rules according to this invention, sending station 2(3) joins the transmission queue and awaits its turn to transmit, while sending stations 2(1) and 2(4) obtain exclusive use of the second CMS 5(2) in order to resolve their collision. The normal transmission of data in DS 4 continues. FIG. 4a shows the status of the transmission before reaching common node 20. FIG. 4b shows the status of the transmission after reaching common node 20.

As shown in FIG. 4b, DS 4 is transmitted to all sending stations 2(1)–2(4), and is also transmitted to all remaining sending stations 2(n). The single-crosshatched CMS 5 shown in FIG. 4b which is transmitted to all sending stations 2(1)–2(n) represents a successful CMS 5. The double-crosshatched CMS 5 sent to each sending station 2(1)–2(n) represents collided CMS 5, which is a result of the transmission shown within the second CMS 5(2) in FIG. 4a. As shown in FIG. 4b, the gap between DS 4 and the double-crosshatched CMS 5 being transmitted to each sending station 2 represents the fact that there was not transmission in the third CMS 2(3), as shown in FIG. 4a. Also as shown in FIG. 4a, station 2(2) is transmitting data and is at the head of the transmission queue.

FIGS. 4a and 4b represent one preferred logical organization of stations 2(1)–2(n) and the remaining network. In practical hardware applications, each CMS 5 and each DS 4 can be transmitted via transmission channel 3 which may comprise fiber, unshielded twisted pair (UTP) copper, shielded copper, coaxial cable such as that used in CATV systems, or any other suitable material. All sending stations 2 can be connected to a folded cable, which is particularly useful where a dual bus is employed. The network topology can be tree and branch, star, or any other suitable combination of other conventional topologies. It is apparent that common node 20 shown in FIGS. 4a and 4b may comprise any other suitable hardware. Furthermore, a wireless station or wireless system can be used and may comprise spread spectrum, and all of the conventional forms of signal transmission.

It is also apparent that FIGS. 4a and 4b can be put into practice with a satellite circuit wherein common node 20 is the satellite which accepts incoming signals on one frequency and maps them into another frequency for transmission to ground sending stations 2. Such ground sending stations 2 can transmit back on a third frequency to the satellite when the satellite maps the third frequency into a fourth frequency back to a main station. Depending upon the particular technology, a satellite can be equipped with means for detecting the collisions of CMS 5 and then for transmitting the feedback results to ground sending stations 2 along with DS 4. One advantage of such system is considerable reduction of a delay since sending stations 2 would receive the feedback after one round trip to a satellite in approximately 250 milliseconds, in lieu of the conventional two round trips which requires approximately 500 milliseconds. The CCTFB method according to this invention would be suitable to use in such a satellite circuit. In the instance of satellite circuits, an interleaving technique would be used to maintain the high efficiency of the DQRAP according to this invention.

Figure 4C:
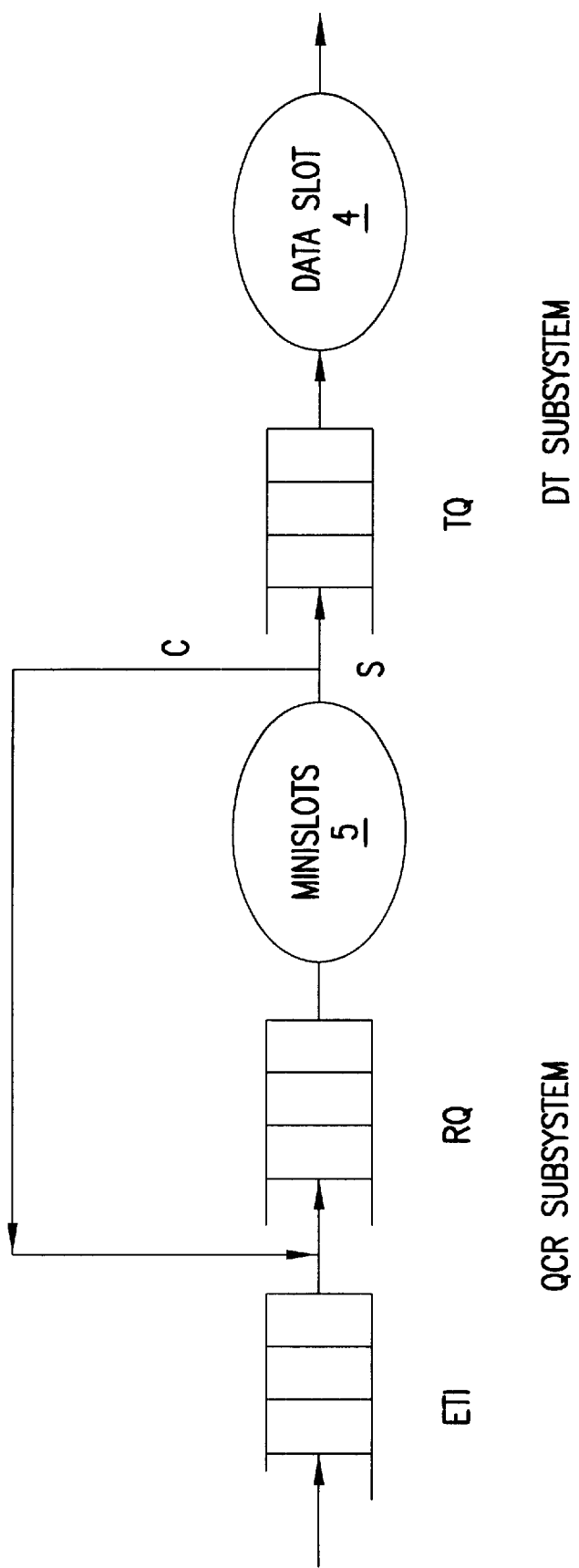
FIG. 4c is a schematic diagram showing a DQRAP according to one preferred embodiment of this invention, which is modeled as a queueing system having two subsystems, a queueing contention resolution subsystem (QCR) and a data transmission subsystem (DT)

The DQRAP of this invention can be modeled as a queueing system comprising two subsystems, as shown in FIG. 4c: (1) a queueing contention resolution subsystem (QCR); and (2) a data transmission (DT) subsystem. Such model can be used to evaluate the throughput of the DQRAP. DTR(1) is not considered, because it does not affect system throughput, as previously indicated. The servers of the QCR subsystem can be modeled as a G/D/1 queue, the server being the data slot, the service time being one slot per message.

Analysis of the subsystems first requires the calculation of the expected length $L_n$ of the CRI, defined as the period commencing with the time slot containing the initial queueing contention, if any, and ending with the slot in which the initial queueing contention is resolved. The variable n represents the number of sending stations 2 involved in the initial queueing contention and is called the multiplicity of CRI in the contention resolution algorithm literature. For consistence, a successful transmission is defined as a conflict of multiplicity 1 while an empty ETI is defined as a conflict of multiplicity 0. With $L_n$ as the expected length of CRI with multiplicity n, $L_n$ can be calculated as follows:

$$L_0 = L_1 = 1$$

$$L = \frac{m}{m-1} \quad \text{Eqn. 3}$$

$$L_n = \frac{1 + \frac{\sum_{k=2}^{n-1} \binom{n}{k}(m-1)^{n-k} L_k}{m^{n-1}}}{1 - \frac{1}{m^{n-1}}} \quad (\text{where } n > 2) \quad \text{Eqn. 4}$$

The variable m represents the number of minislots which is chosen by performance requirements. FIG. 5 is a table containing values of $L_n$ as obtained from Eqns. 2–4 with different values of m. FIG. 5 shows that when $m \leq 3$, $L_n < n$ for n>1. This means a collision of multiplicity n can be resolved in less than n slots, which is the time to transmit n messages. Thus, the speed of contention resolution is faster than the speed of data transmission, which is a very important aspect of this invention. The DQRAP of this invention is stable if and only if both the QCR subsystem and the DT subsystem are stable. Stability conditions of the QCR subsystem can be determined by using Markov chain theory. The maximum stable input rate, or throughput, can be determined by the following formulae:

FIG. 6 shows the maximum input rates and the corresponding window sizes as a function of minislot number. FIG. 6

$$C = \sup \frac{\mu}{\sum_0^\infty L_n \frac{\mu^n}{n!} e^{-\mu}} \quad (\text{where } \mu = \lambda W_0) \quad \text{Eqn. 5}$$

shows that if m>2 the QCR subsystem is stable even when the input rate is greater than 1. Next consider the DT subsystem. The DT subsystem can generally be modeled as a G/D/1 queue. Though the QCR subsystem can be stable with the input rate greater than 1, G/D/1 is stable only when the input rate is less than 1. Thus the DQRAP is stable when the traffic intensity is less than 1. The QCR subsystem can resolve collisions faster than the speed of data transmission thus guaranteeing that the QCR subsystem will not block input traffic to the whole system.

The performance of the DQRAP is determined by the QCR subsystem and the DT subsystem. The QCR subsystem does not affect data transmission, and is stable even when the traffic intensity is greater than 1 if three or more minislots are utilized. Thus, since the QCR subsystem does not block traffic to the whole system, the system throughput is entirely determined by the DT subsystem, for example, the DQRAP can achieve a maximum theoretical throughput approaching one if three or more minislots are utilized. When the minislot overhead is included, the actual throughput, or utilization, that can be achieved is:

$$U = \frac{\min\{\lambda, 1\}}{1 + m\delta} \quad \text{Eqn. 6}$$

Figure 7:
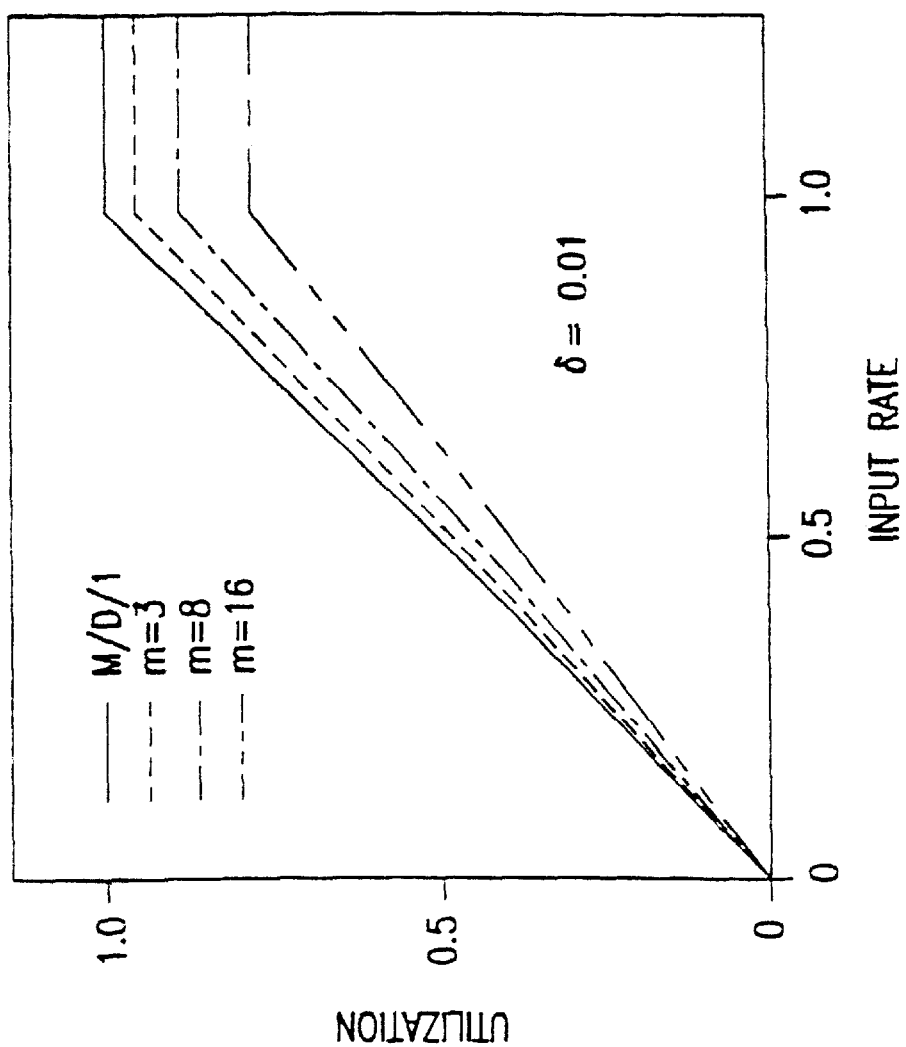
FIG. 7 is a graph showing the actual throughput of the DQRAP of this invention as a function of the input rate and the number of minislots, with the overhead equal to 0.01.
Figure 8:
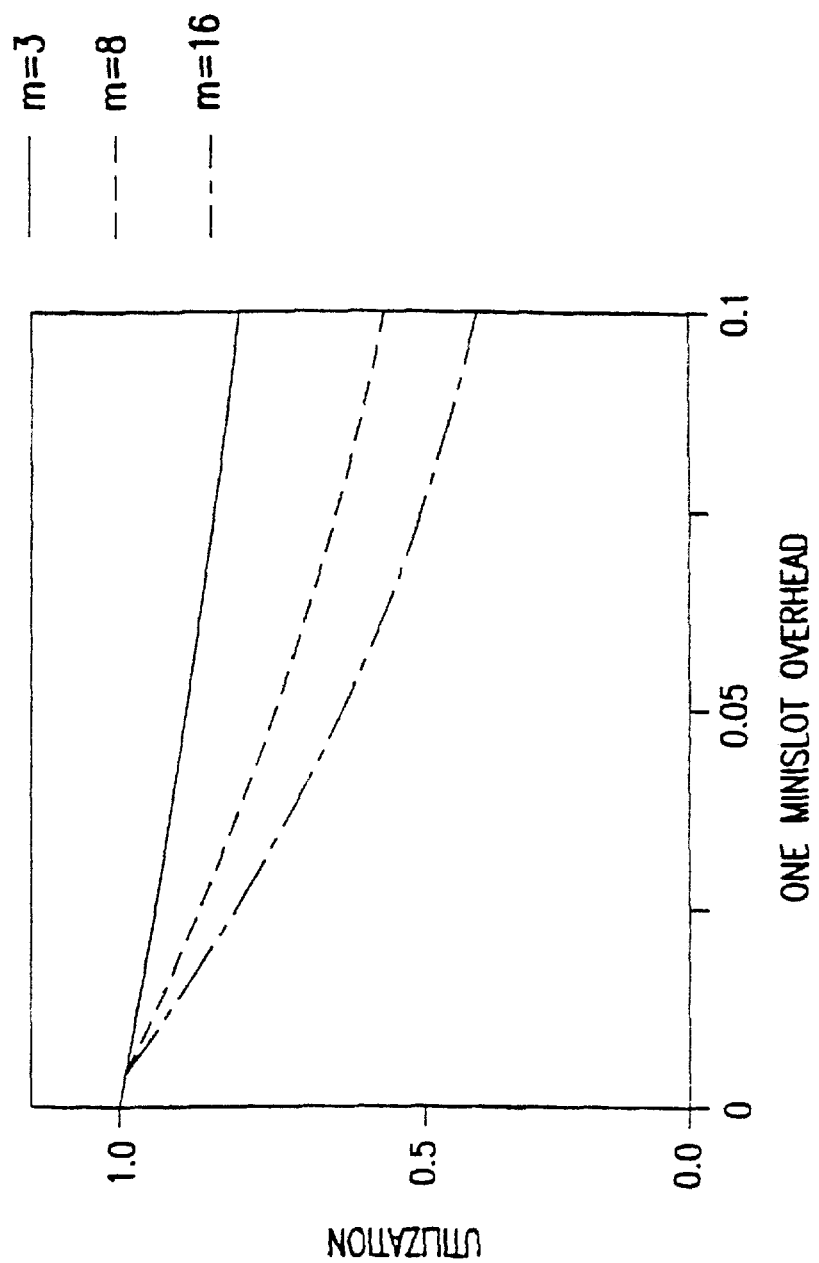
FIG. 8 is a graph showing a relationship of the maximum actual throughput as a function of one minislot overhead and the minislot number.

FIG. 7 shows the throughput of the DQRAP according to this invention as a function of the input rate and the number of minislots with the overhead equal to 0.01. FIG. 8 shows the relationship of the throughput and the number of minislots. It is apparent that high actual throughout suggests that the number of minislots selected should be as small as possible. Fortunately, evaluation shows that with as few as three minislots, the DQRAP achieves a maximum theoretical throughput of one. The analytical solution of delay characteristics for the DQRAP is known. Here an accurate simulation has been used to obtain the delay performance of the DQRAP and this performance may be evaluated by comparing it to a perfect scheduling protocol.

Figure 9:
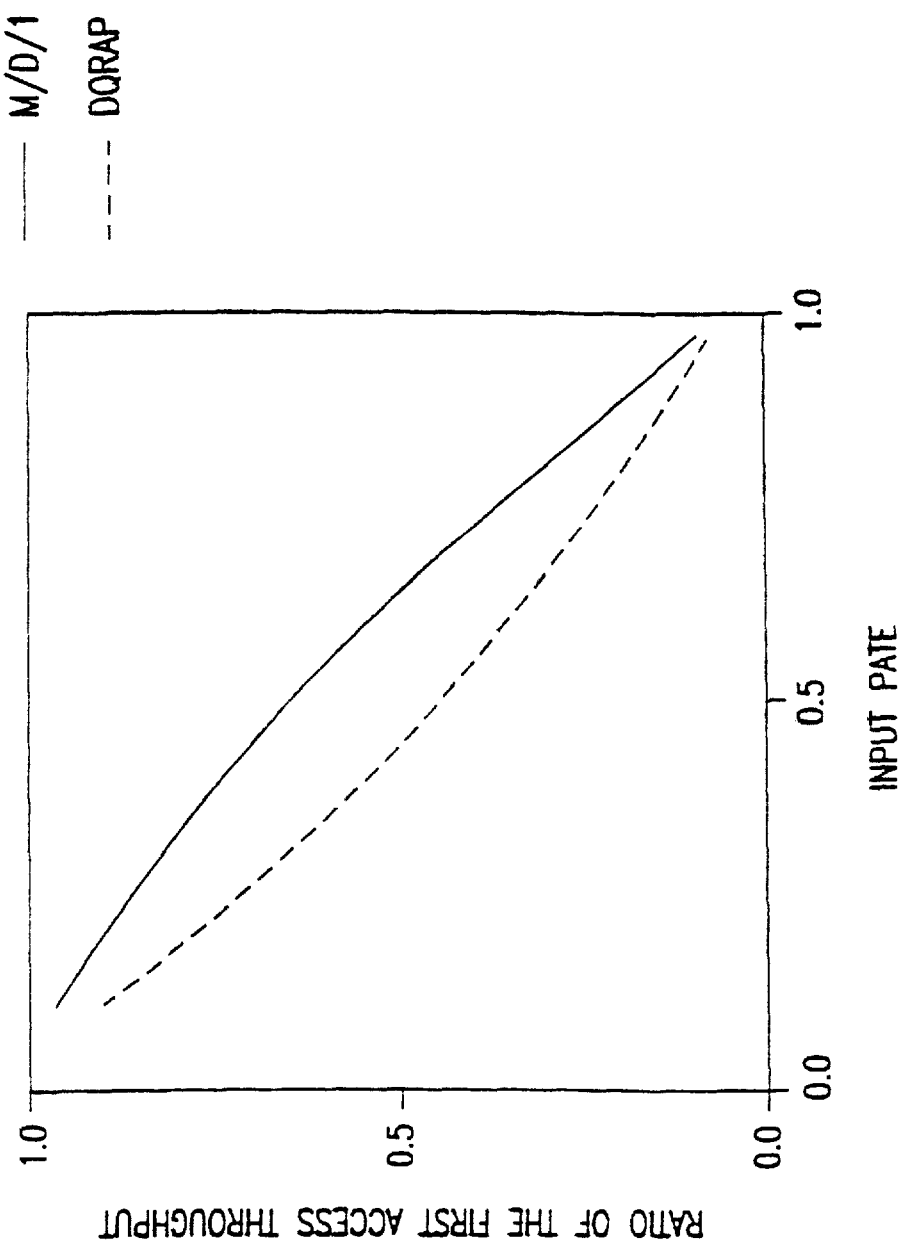
FIG. 9 is a graph showing the percentage of the first access throughput of the DQRAP of this invention, as a function of the input rate.
Figure 12:
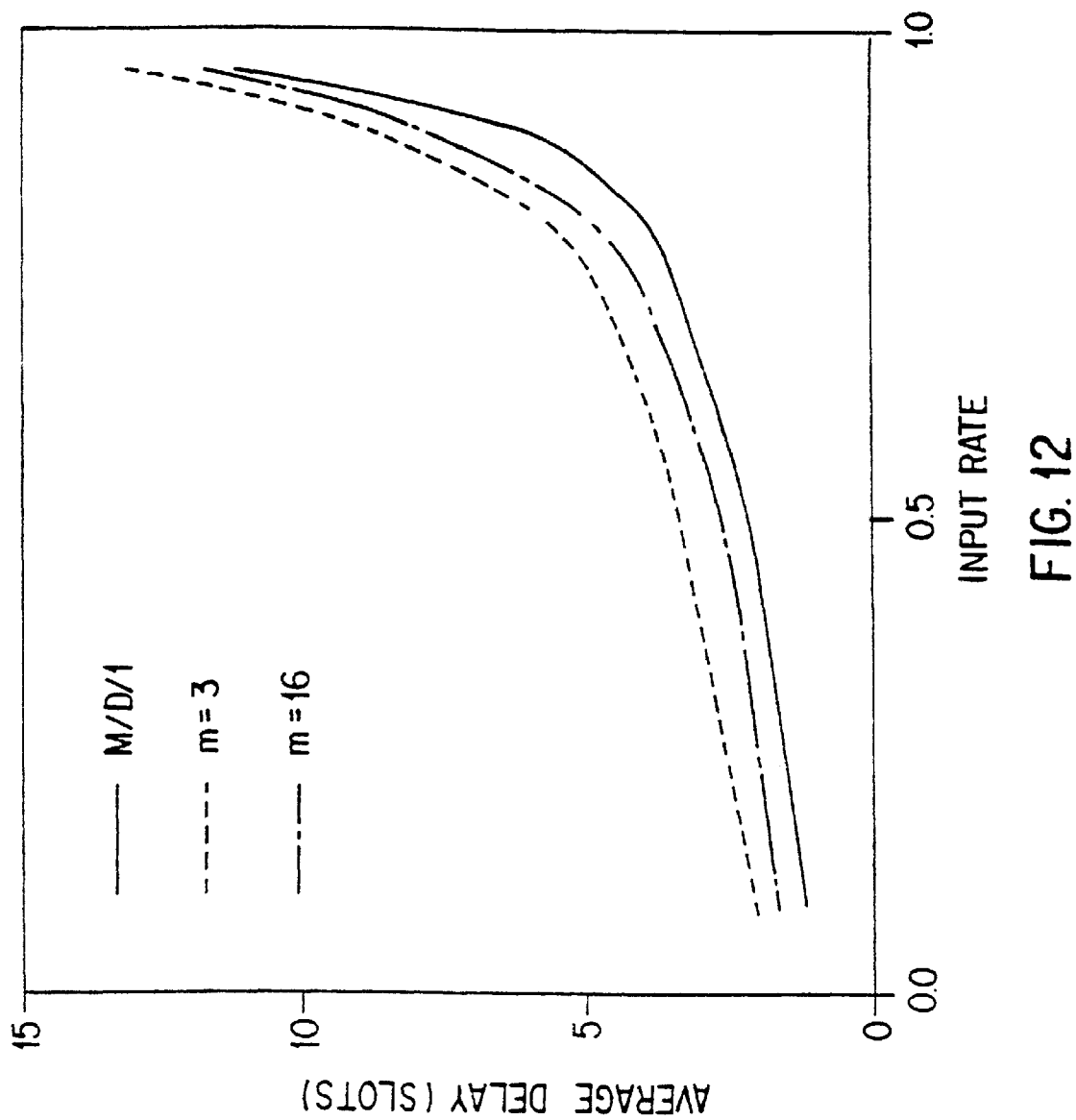
FIG. 12 is a graph showing simulated results of the average delay as a function of the input rate, for the DQRAP of this invention with three and sixteen minislots, as compared to that of an M/D/1 system.

Simulations, based upon the algorithm previously described rather than the above model, have been carried out according to this invention. The simulations show that the DQRAP according to this invention demonstrates good system stability, in particular all messages are guaranteed to be transmitted with a limited delay for all input rates less than or equal to 0.99. This is consistent with a system stability analysis. The performance bound for all random access protocols for a slotted broadcast channel shared by an infinite number of Poisson sources is that of a hypothetical perfect scheduling protocol, such as the M/D/1 system. Thus the performance of the DQRAP of this invention is best demonstrated by comparison with that of the M/D/1 system. FIG. 9 shows the ratio of the first access throughput, which is defined as the ratio of messages successfully transmitted in the first slot after their arrival to system throughput of the DQRAP, as a function of the input rate, using three minislots as compared to the M/D/1 system. FIG. 10 contains average delay and corresponding deviation of the DQRAP, three minislots being used, as compared with the M/D/1 system. FIG. 10 shows that the average delay of the DQRAP is very close to the average delay of the M/D/1 system, and the maximum difference of average delays between the M/D/1 system and the DQRAP of this invention is less than three slots when the input rate is less than 0.95. FIG. 11 shows simulated average delay and deviation of the DQRAP with a varying number of minislots. FIG. 12 plots simulation results showing the average delay of the DQRAP along with that of an M/D/1 system. FIG. 11 shows that increasing the number of minislots does not impact the maximum theoretical throughput and even though the average delay is affected by the number of minislots it appears that for most practical purposes the number of minislots need not be greater than four. Finally, the DQRAP was compared with the best known tree protocols with minislots, namely, the announced arrival random access (AARA) protocols. To achieve a theoretical throughput approaching one the announced arrival tree protocols require an infinite number of minislots, but the DQRAP of this invention requires as few as three minislots. Using three minislots the announced arrival tree protocols achieve a throughput of 0.853. The DQRAP according to this invention provides better performance than the best tree protocols known to date.

According to one preferred embodiment of this invention, a method for controlling multiple access of a transmission channel, which is preferably a duplex channel, includes assigning a plurality of different patterns to sending stations 2 so that each sending station 2 corresponds to a unique pattern. According to one preferred embodiment of this invention, each different pattern is represented by a different Binomial coefficient C(n,k). Such Binomial coefficient C(n, k) represents one of a number of ways that k distinct objects can be selected from a set of n elements. The variable n is preferably in a range from 3 to 40, and for most practical applications is in a range from 4 to 15.

The variable n is preferably approximately equal to two times the variable k, such that a maximum number of different patterns can be obtained from the Binomial coefficient C(n,k). Each Binomial coefficient can be conveniently represented by a unique binary value. It is apparent that other patterns can be used to identify each sending station 2. However, by using a Binomial coefficient C(n, k), it is apparent that each unique pattern can easily be communicated through transmission channel 3, such as suitable wire or fiber optic line.

Each unique pattern is transmitted from a corresponding sending station 2 to transmission channel 3 by way of CMS 5. Computing means are used to receive ternary feedback from CMS 5 and to then analyze the summation of the different patterns within each CMS 5 to detect whether a collision exists between the different patterns within any particular CMS 5.

According to one preferred embodiment of this invention, an existing collision is detected by using the ternary feedback to differentiate between an absence of the pattern or no pattern present, a presence of only a single pattern, or a presence of a plurality of the patterns within any one particular CMS 5. If a collision is detected, then data to be transmitted over transmission channel 3, from each sending station 2, is prioritized according to the DQRAP of this invention.

In one preferred embodiment of this invention, the DQRAP functions according to the DTR, RTR and QDR, as discussed above.

The DQRAP according to this invention is a medium access control method which can provide performance with respect to throughput and delay approaching that of a perfect scheduling protocol. The DQRAP is stable at all input rates of less than 1 when three or more CMS 5 are utilized. The DQRAP can be implemented by overcoming the usual problems attendant with any conventional medium access control method. The major challenge is obtaining ternary feedback but it appears that this is feasible in broadband signalling over copper, fiber, and air and with baseband signalling on copper and fiber.

Figure 13:
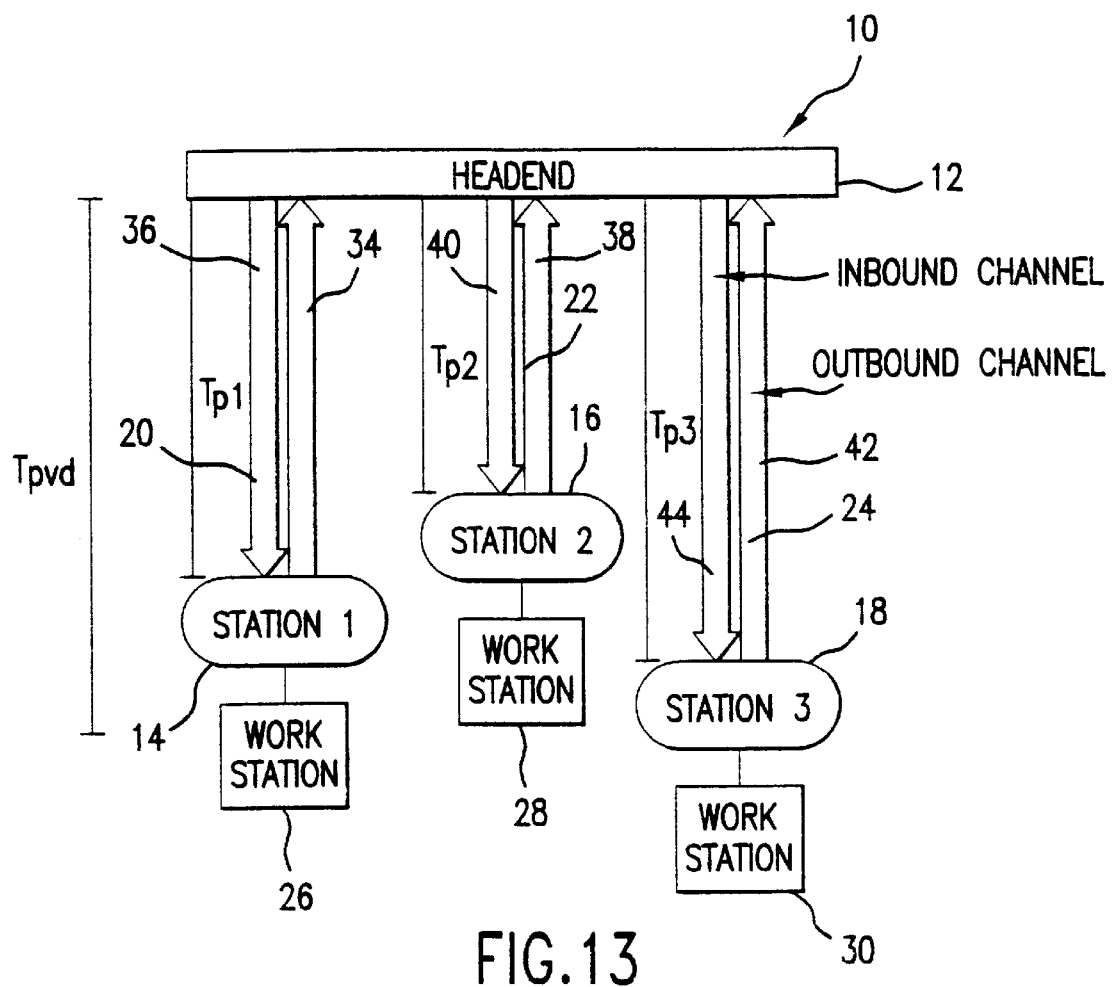
FIG. 13 is a block diagram of a local area network, including multiple stations and a head-end, which network embodies the present invention.
Figure 14:
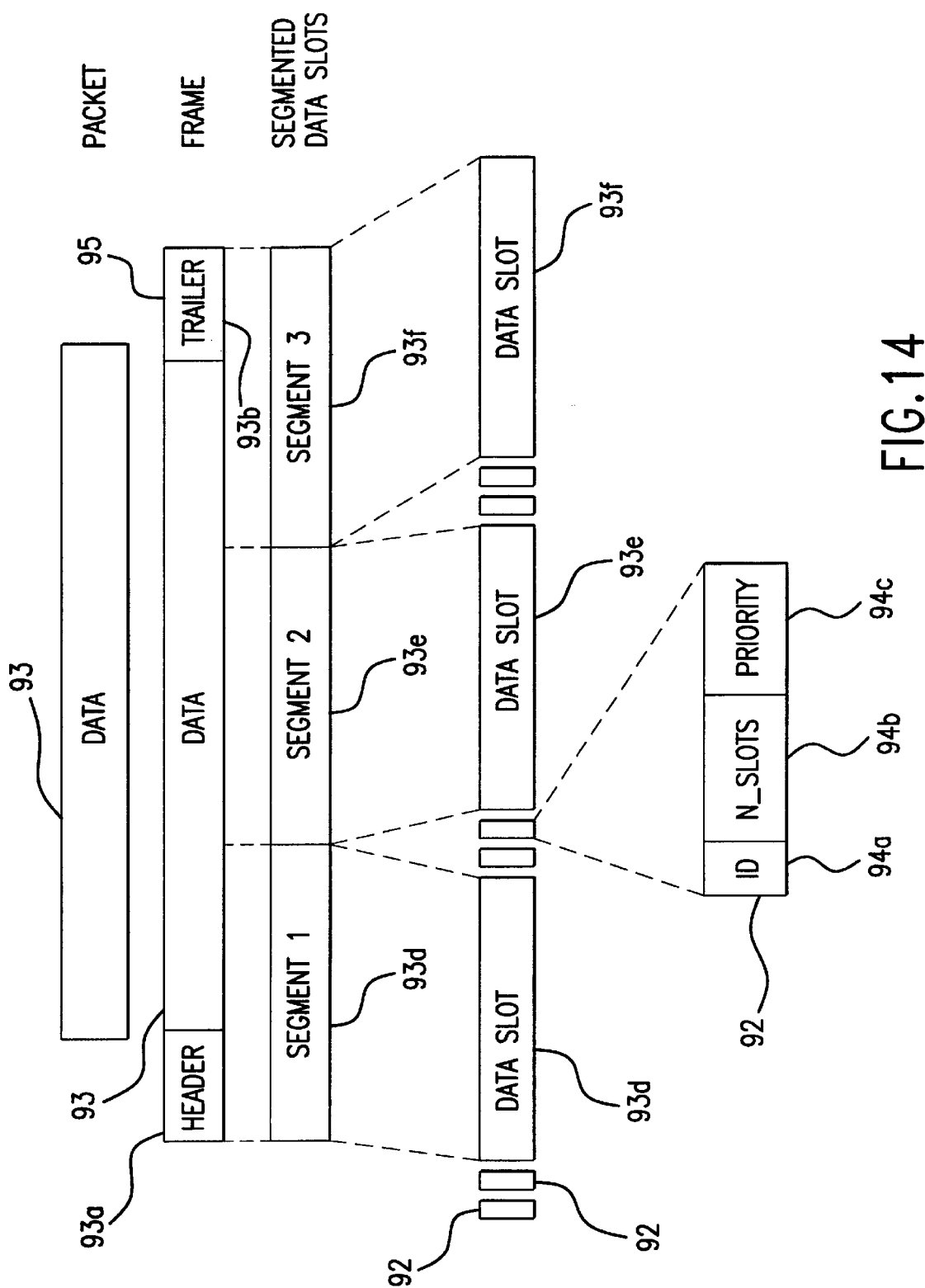
FIG. 14 is a slot diagram; the manner in which the control minislots and data segments are produced by each of the work stations shown in FIG. 13.
Figure 15:
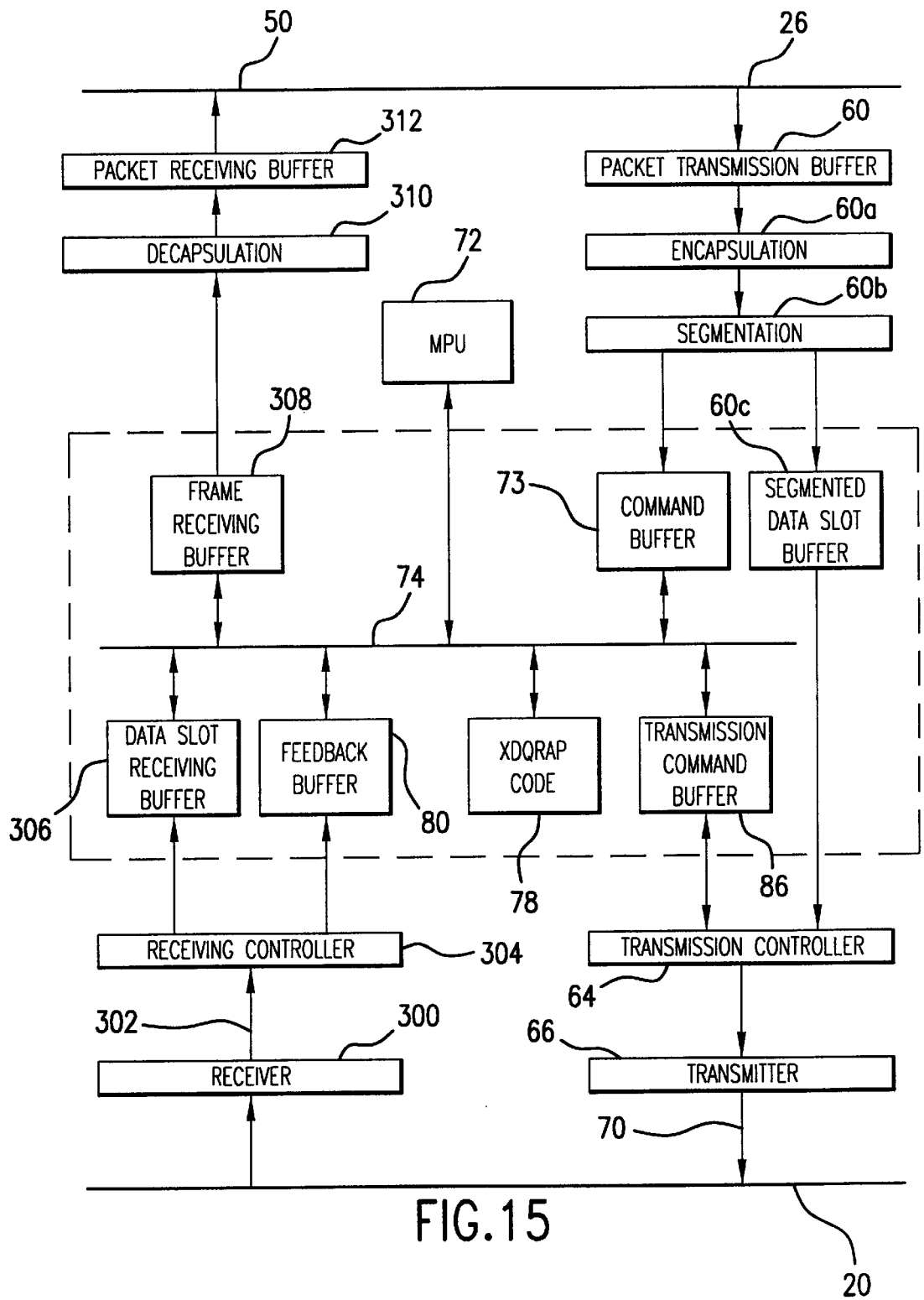
FIG. 15 is a block diagram of nodal apparatus forming part of the stations shown in FIG. 13.
Figure 16:
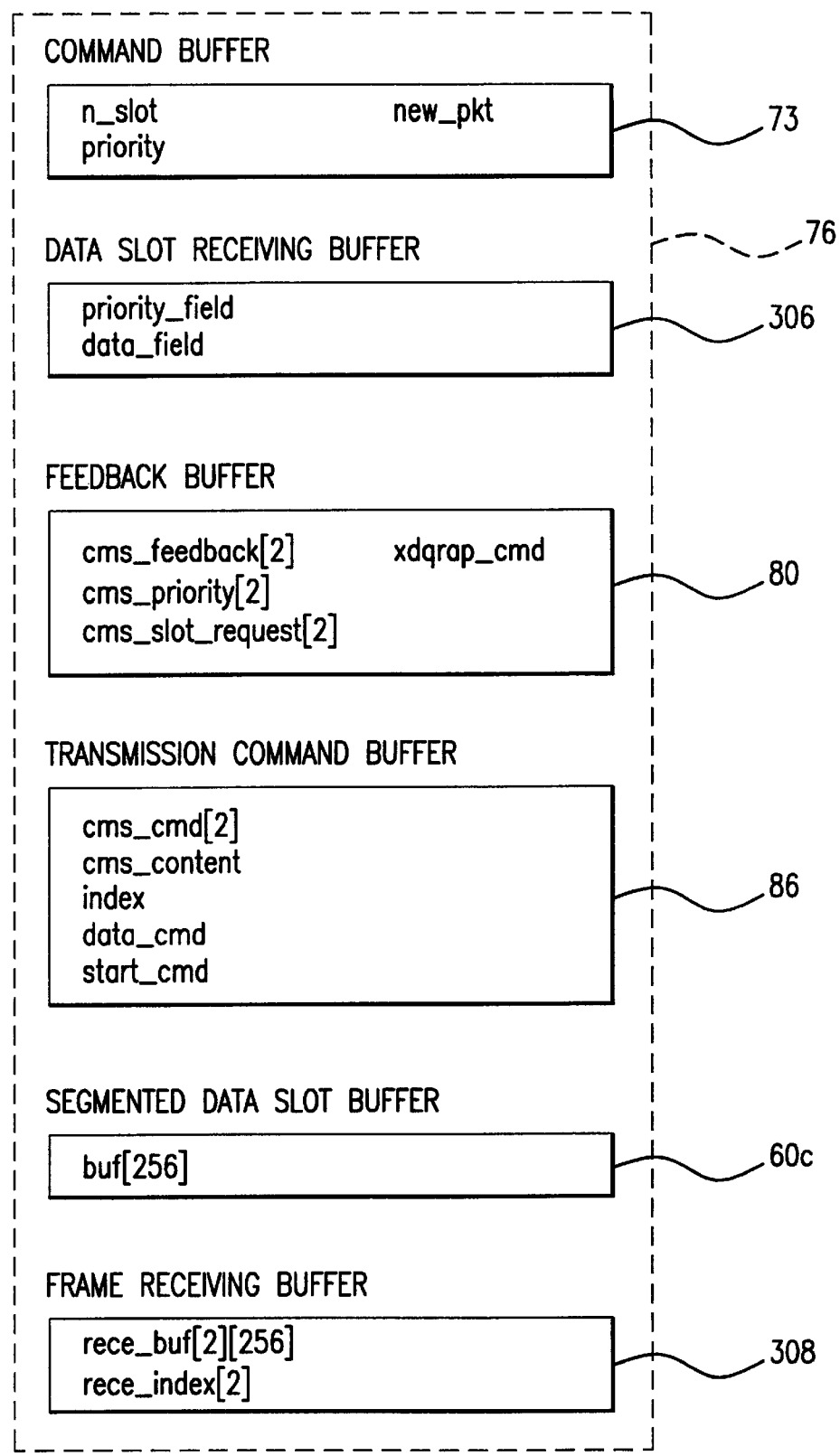
FIG. 16 is a partial memory map describing the buffers defined within the memory of FIG. 15.
Figure 17:
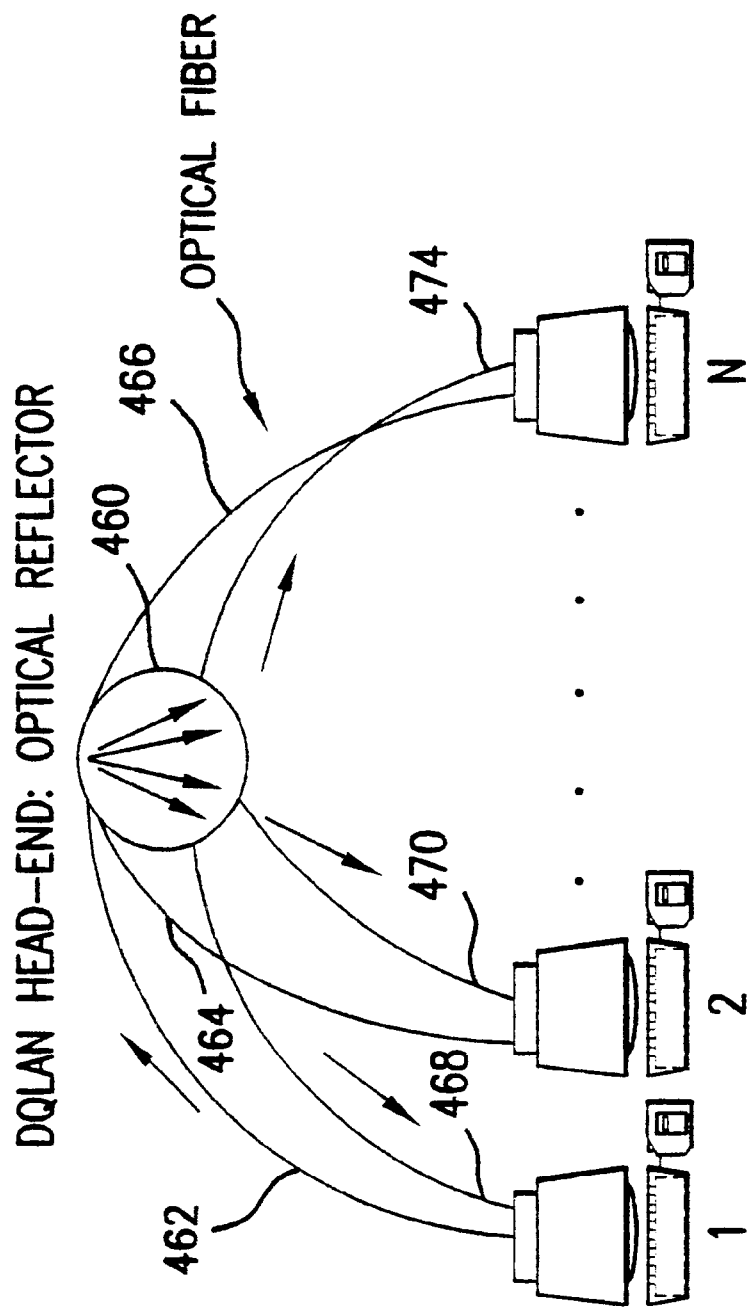
FIG. 17 is a block diagram of a passive head-end unit.

In an alternative embodiment, as shown in FIG. 13, a local area network embodying the present invention is shown therein and generally identified by numeral 10 and employs one of the previously discussed collisions detector methods over a baseband or broadband channel. The local area network includes a head-end unit 12 and a plurality of nodal stations or apparatus 14, 16 and 18 connected thereto by respective buses 20, 22 and 24. A workstation, which may be a personal computer, minicomputer, workstation or the like is connected to nodal apparatus 14. Workstation 28 is connected to nodal apparatus 16 and a workstation 30 is connected to nodal apparatus 18. It may be appreciated, as well, that the bus 20 includes an outbound channel 34 and an inbound channel 36. Likewise, bus 22 includes an outbound channel 38 and an inbound channel 40 and bus 24 includes an outbound channel 42 and an inbound channel 44. As may best be seen, each of the nodal apparatus or nodal stations 14, 16 and 18 are substantially identical. Station 14 is shown as may best be seen in FIG. 15. The nodal apparatus 14 is also coupled to a system bus 50 of the workstation or personal computer 26. That system bus may be an ISA, EISA or VESA. The nodal apparatus 14 receives data in a packet transmission buffer 60. The packet is encapsulated in an encapsulator 60a and passed to the segmenter 60b. The individual segments are then passed to the segmented data slot buffer 60c. A transmitter 66 is connected via a bus 68 to the transmission controller 64 and a transmission bus 70 is connected to the combined inbound and outbound bus 20. The transmission controller 64, however, will only transfer a segment of data which it has received from the segmented data slot buffer 60 if certain other events occur. A microprocessor (MPU) 72 is connected to an internal bus 74 and receives data. Instructions for sending and receiving information to other stations via the head-end 12 are stored in the XDQDRAP code portion of the memory 78 and are regularly fetched by the microprocessor unit 72 and executed as set forth in more detail in the code in following Table I and in the accompanying flow charts, FIGS. 18 and 19. As shown in FIG. 14, control minislots 92 each go out the outbound portion of the bus 34, or if the bus is a single wire, travel away from the nodal apparatus 14 to the head end 12 where the head-end 12 will either passively or actively cause control minislots to be delivered to all outbound channels on the system, e.g., channels 36, 40 and 44. Thus, nodal apparatus 14 will receive its own control minislot back as well as nodal apparatus 16 and 18 also receiving the control minislots.

As may be seen in further detail in FIG. 14, data is formed in a packet 93, which packet is then encapsulated in a frame 95, including the data 93, a header 93a and a trailer 93b. The entire frame is then split into three segmented data slots comprising a first segment 93d, a segment 93e and a third segment 93f. Each of the three segments then defines a respective data slot preceded by the pair of control minislots 92. Each of the control minislots 92 includes a 14-bit ID field 94a, an 8-bit request field for the number of slots and a 2-bit priority field 94c. While three segments are used in the preferred embodiment, one segment might be used in alternative embodiments or in the number of multiple segments.

In order to mediate access to the network the receiver 300 is coupled via a bus 302 to the transmission line 20. The transmission line 20, of course, could be optical fiber, coaxial cable, twisted pair or the like. Signals are then fed from the receiver 300 to the receiving controller 304.

The manner in which this is done is set forth in further detail in the code written in the C programming language in the following Table I.

TABLE I

```
int H_TQ, N_TQ, RQ;
int H_TQseq, N_TQseq, RQseq;
XDQRAP()
{
    new_pkt = 0;
    xdqrap_cmd = 0;
    H_TQ = N_TQ = RQ = 0;
    H_TQseq = N_TQseq = RQseq = 0;
    while(1) {
        while(xdqrap_cmd == 0);
        xdqrap_cmd = 0;
        XDQRAP_QDR();
        XDQRAP_RTR();
        XDQRAP_DTR();
        start_cmd = 1;
    }
}
XDQRAP_QDR()
{
    int k, n_request;
    n_request = cms_feedback[0] + cms_feedback[1];
    for(k = 0; k < 2; k++) {
        if (cms_feedback[k] == 1) {
            if (H_TQ + N_TQ == 0 && n_request == 1 && cms_slot_request[k] == 1)
                /* Successful immediate access for one slot request */
            else {
                if (cms_priority[k] == 0) {
                    H_TQ += cms_slot_request[k];
                    if (cms_cmd[k] == 1)
                        H_TQseq = H_TQ;
                }
                else {
                    N_TQ += cms_slot_request[k];
                    if (cms_cms[k] == 1)
                        N_TQseq = N_TQ;
                }
            }
        }
        else {
            RQ++;
            if (cms_cmd[k] == 1)
                RQseq = RQ;
        }
    }
}
XDQRAP_RTR()
{
    cms_cmd[0] = cms_cmd[1] = 0;
    if (RQ > 0) {
        if (RQseq == 1)
            Select_CMS();
        if (RQseq > 0)
            RQseq--;
    }
    else if (new_pkt == 1)
        Select_CMS();
}
```

TABLE I-continued

```
XDQRAP_DTR()
{
    data_cmd = 0;
    if (H_TQ > 0) {
        if (H_TQseq == 1) {
            data_cmd = 1;
            n_slot--;
            if (n_slot == 0)
                H_TQseq = 0;
        }
        H_TQ--;
        if (H_TQseq > 1)
            H_TQseq--;
    }
    else if (N_TQ > 0) {
        if (N_TQseq == 1) {
            data_cmd = 1;
            n_slot--;
            if (n_slot == 0)
                N_TQseq = 0;
        }
        N_TQ--;
        if (N_TQseq > 1)
            N_TQseq--;
    }
    else {
        if (new_pkt == 1 && n_slot == 1)
            data_cmd = 1;
    }
    if (RQ > 0)
        RQ--;
    if (cms_cmd[0] + cms_cmd[1] > 0)
        new_pkt = 0;
}
Select_CMS()
{
    int k;
    select an integer k between 0 and 1 randomly
    cms_cmd[k] = 1;
}
```

Information received from the receiving controller 304 is passed to a data slot receiving buffer 306 which is then made available on the internal bus 74 and may be transferred to a frame receiving buffer 308. The frame receiving buffer then passes the multiple segments to a decapsulator 310 which splits the segments back down and feeds them to a packet receiving buffer 312 which makes the packets of data available to the work station on its system bus 50.

The head-end simply has a common bus to which a plurality of isolator repeaters 450, 452 and 454 are connected such that when any signal is received on an inboard line, it is immediately sent back on all of the outgoing buses.

If an optical network system is used, such as an optical fiber, the optical fibers are all joined together into an optical multiplexing head 460 and any signal received on an inbound bus 462, 464 and 466 will be sent out on all of the outbound buses 468, 470 and 474.

Figure 18:
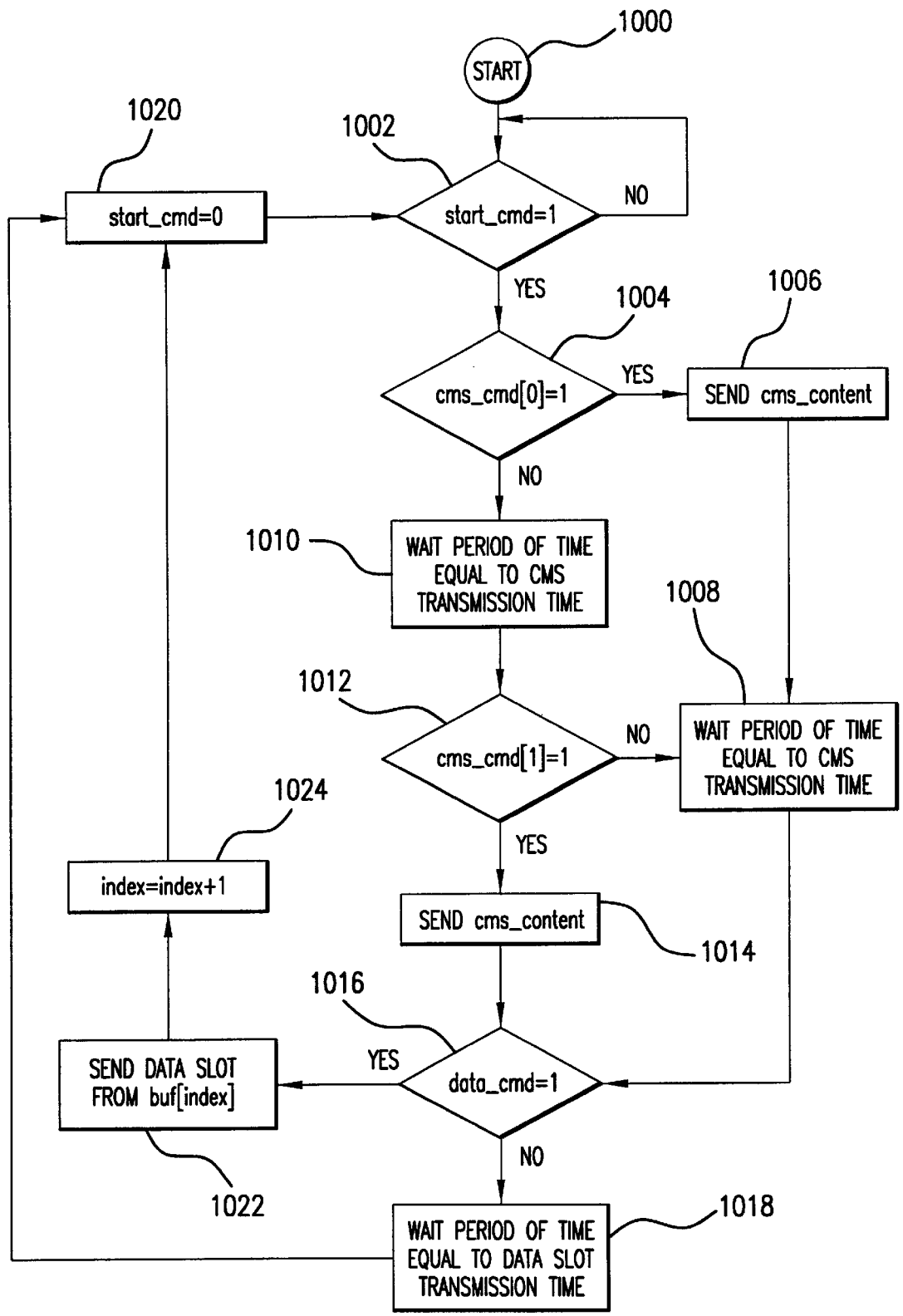
FIG. 18 is a flow chart describing the actions of a transmitter controller.
Figure 19:
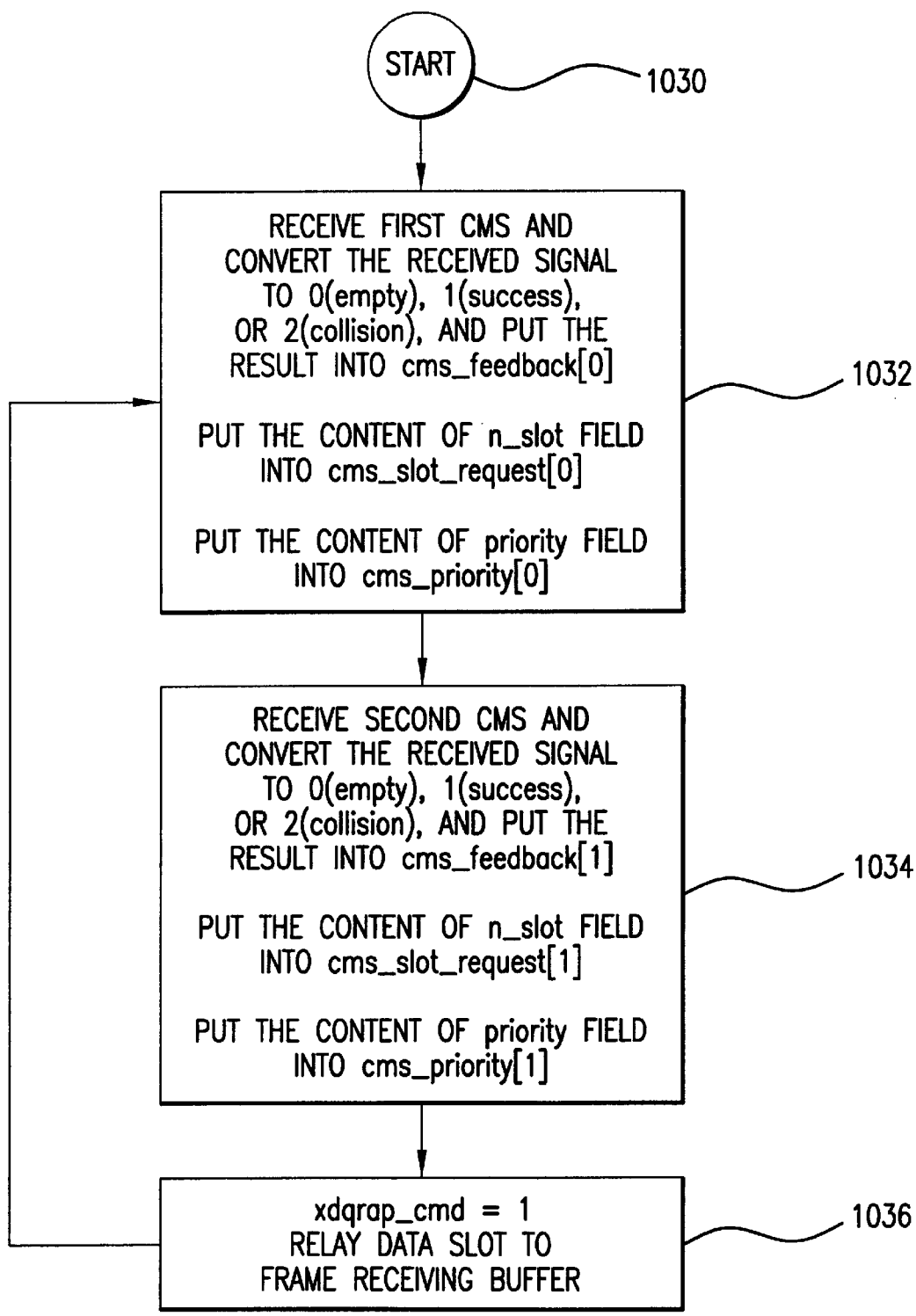
FIG. 19 is a flow chart describing the activities of a receiving controller.
Figure 20:
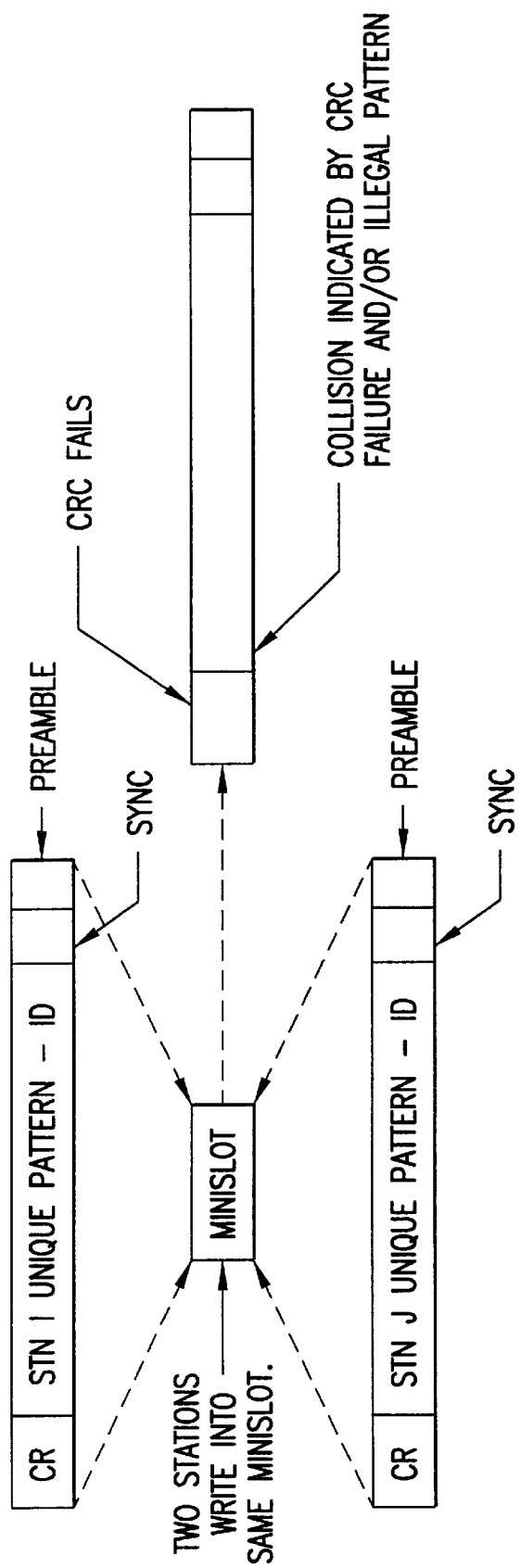
FIG. 20 is a block diagram describing a minislot collision involving minislots, including cyclic redundancy check fields.
Figure 22:
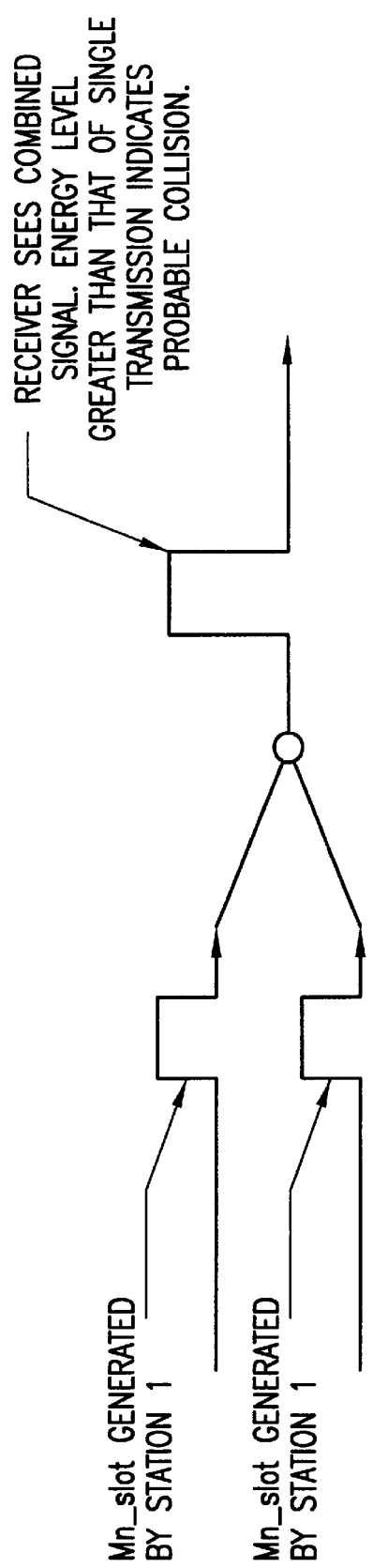
FIG. 22 is a block diagram showing a collision resulting in a combined energy level.
Figure 23:
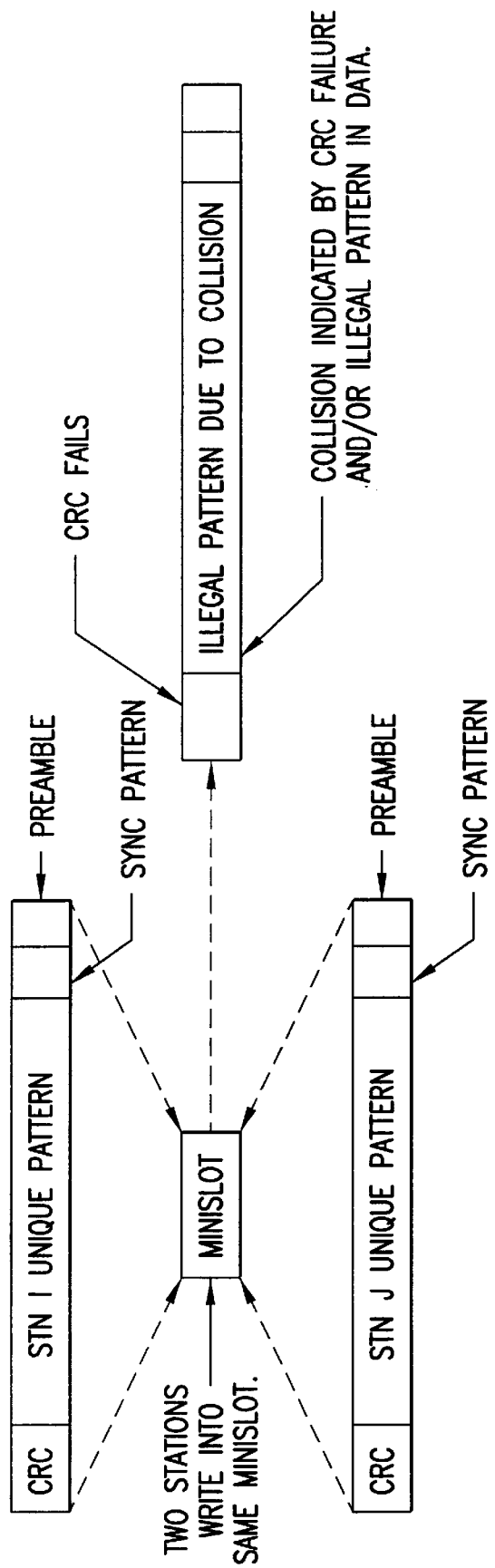
FIG. 23 is a block diagram indicative of the results of a collision involving control minislots.

As shown in FIG. 18, the transmission controller initiates action at a start step 1000, following which the start command flag is tested for whether it is equal to 1 or not in a step 1002. If it is not, control is transferred back to loop back into the decision block 1002. If the start command flag has been set, control is transferred to test for whether the zero CMS command flag has been set equal to 1 in a step 1004. If it has, the control minislot is sent in the step 1006. In a step 1008, because a station had sent in the first control minislot, it then delays in the step 1008 for a control minislot interval so that it does not send during the second slot. In the event the CMS command zero flag has not been set, as tested for in step 1004, a step 1010 is executed wherein the first control minislot time is delayed. Control is then transferred to a decision block 1012 where a test is made for whether the CMS command flag 1 has been set. If it has not, control is transferred to the step 1008. The number of data slots requested is then stored in the CMS slot request and the priority field indicating whether high priority or not has been requested is placed into the control minislot priority. In a step 1034, the control minislot is received and the same variables are loaded into corresponding positions. In a step 1036, an XDQRAP command flag is set equal to 1 and the data received from the data slot is relayed to a frame receiving buffer, following which step 1032 is executed.

Thus, what has been disclosed is an extended distributed queue random access protocol which causes a distributed contention resolution queue to be stored in each of the stations, which contention resolution queue is responsive to the control minislots which have been received. The control minislots each consist of an identification field which identifies the station from which the control minislots originate and includes a number of slots field which is a field which requests the number of data slots which are to be reserved, usually on a contiguous basis for multiple data slot transmission and includes a priority field. The priority field is indicative of whether the data slots which are to be reserved are to be reserved in a transmission queue or in a higher priority transmission queue, which transmission queue will have a priority which matches the priority indicator in the priority field. In the event that the high priority distributed transmission queue distributed among the various stations, which operates in the same manner as the transmission queue, will cause data to be transmitted in data slots on a higher priority than the data slots reserved by the ordinary transmission queue. What has been provided is an extended distributed queue random access protocol-based system which, by placing the number of data slots requesting feature in the control minislots, drastically reduces the amount of overhead which might normally be encountered and increases the throughput through the system. It does this by causing the number of transmission slots being requested to be requested during the contention resolution phase of the slot cycle, as opposed to the data phase of the slot cycle. This allows multiple data slots to be transmitted without the accompanying overhead in each data slot related to slot numbers and the like.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A nodal apparatus for sending and receiving digital data in multiple data slots, comprising:

means for transmitting a request for multiple data slots during a control minislot;

means for maintaining a conflict resolution queue representative of nodal apparatus sending substantially simultaneous requests for transmission resulting in a collision in a minislot;

means for maintaining a transmission queue representative of nodal apparatus that have successfully transmitted in a minislot and can be queued for data slot transmission;

means for sending multiple data slots signals comprising multiple slots of digital data in response to the transmission queue; and means for receiving multiple data slots signals comprising digital data.

2. A nodal apparatus according to claim 1, further comprising means for receiving a control minislot, wherein said means for receiving a control minislot produce a minislot signal to which said means for maintaining the conflict resolution queue and said means for maintaining the transmission queue are responsive.

3. A nodal apparatus according to claim 1, further comprising means for maintaining a high priority transmission queue of nodal apparatus that have successfully transmitted in a control minislot and can be queued for high priority data slot transmission.

4. A data transmission network comprising:

a nodal apparatus for sending and receiving digital data in multiple data slots, comprising:

means for transmitting a request for multiple data slots during a control minislot;

means for maintaining a conflict resolution queue representative of nodal apparatus sending substantially simultaneous requests for transmission resulting in a collision in a minislot;

means for maintaining a transmission queue representative of nodal apparatus that have successfully transmitted in a minislot and can be queued for data slot transmission;

means for sending multiple data slots signals comprising digital data in response to the transmission queue;

means for receiving multiple data slots signals comprising digital data; and a head-end apparatus for receiving control minislot signals and multiple data slots from said nodal apparatus, said head-end system comprising means for receiving a control minislot and means for transmitting a signal to multiple nodal apparatus indicative of whether two or more nodal apparatus are asserting a request for access to a data slot.

5. A data transmission network according to claim 4, wherein said head-end apparatus comprises a network for transmitting said control minislot signal to additional nodal apparatus.

6. A data transmission network according to claim 4, further comprising means for maintaining a high priority transmission queue of nodal apparatus that have successfully transmitted in a control minislot and can be queued for high priority data slot transmission.

7. A data transmission network according to claim 4, wherein said head-end apparatus comprises parallel port means for simultaneous receipt of control minislot signals from multiple nodal apparatus;

means for detecting whether a transmission during a transmission slot comprises an initial data slot signal or an initial control minislot signal;

means for arbitrating a conflict between data slot signals arriving substantially simultaneously during a single transmission slot, said data slot conflict resolution means causing said first received data slot signal to be forwarded to at least one receiving nodal apparatus, wherein said second transmitting nodal station detects the first transmitted data slot signal and, in response thereto, delays further transmission until a successive slot when it transmits a control minislot signal for receipt by the head-end followed immediately by the data from the second transmitted data slot.

* * * * *